United States Patent
Yao et al.

(10) Patent No.: US 12,130,498 B2
(45) Date of Patent: Oct. 29, 2024

(54) OPTICAL LENS ASSEMBLY

(71) Applicant: NINGBO SUNNY AUTOMOTIVE OPTECH CO., LTD, Ningbo (CN)

(72) Inventors: Bo Yao, Ningbo (CN); Dongfang Wang, Ningbo (CN)

(73) Assignee: NINGBO SUNNY AUTOMOTIVE OPTECH CO., LTD, Ningbo (CN)

( * ) Notice: Subject to any disclaimer, the term of this patent is extended or adjusted under 35 U.S.C. 154(b) by 933 days.

(21) Appl. No.: 17/105,824

(22) Filed: Nov. 27, 2020

(65) Prior Publication Data

US 2021/0080694 A1 Mar. 18, 2021

Related U.S. Application Data

(63) Continuation of application No. PCT/CN2019/079985, filed on Mar. 28, 2019.

(30) Foreign Application Priority Data

May 30, 2018 (CN) .......................... 201810538155.9
May 30, 2018 (CN) .......................... 201810538165.2

(51) Int. Cl.
*G02B 9/64* (2006.01)
*G02B 13/00* (2006.01)
(Continued)

(52) U.S. Cl.
CPC ........... *G02B 9/64* (2013.01); *G02B 13/0045* (2013.01); *G02B 13/06* (2013.01); *G02B 13/18* (2013.01)

(58) Field of Classification Search
CPC ...... G02B 9/64; G02B 13/0045; G02B 13/06; G02B 13/18
See application file for complete search history.

(56) References Cited

U.S. PATENT DOCUMENTS 9,442,277 B1    9/2016   Shih
2006/0274433 A1  12/2006  Kamo
(Continued)

FOREIGN PATENT DOCUMENTS

CN    105467565 A    4/2016
CN    106094170 A    11/2016
(Continued)

OTHER PUBLICATIONS

Machine translation of CN 106772951 retrieved electronically from PE2E Search Sep. 8, 2023 (Year: 2023).*

(Continued)

*Primary Examiner* — Cara E Rakowski
(74) *Attorney, Agent, or Firm* — HAUPTMAN HAM, LLP

(57) ABSTRACT

The present disclosure discloses an optical lens assembly including a first lens, a second lens, a third lens, a fourth lens, a fifth lens, a sixth lens and a seventh lens, which are arranged sequentially from an object side to an image side along an optical axis. The first lens has negative refractive power, an object-side surface thereof is convex, and an image-side surface thereof is concave. The second lens has negative refractive power, an object-side surface thereof is convex, and an image-side surface thereof is concave. The third lens has positive refractive power, and both of an object-side surface and an image-side surface thereof are convex. The fourth lens has refractive power. The fifth lens and the sixth lens are cemented to form a cemented lens. The seventh lens has positive refractive power, and both of an object-side surface and an image-side surface thereof are convex.

19 Claims, 4 Drawing Sheets

(51) Int. Cl.
  *G02B 13/06* (2006.01)
  *G02B 13/18* (2006.01)

(56) References Cited

U.S. PATENT DOCUMENTS

| | | | | |
|---|---|---|---|---|
| 2011/0037828 A1* | 2/2011 | Wakamiya | ............ | G02B 13/06 |
| | | | | 359/749 |
| 2017/0254981 A1* | 9/2017 | Lai | ............ | G02B 13/0045 |
| 2018/0120544 A1* | 5/2018 | Chiang | ............ | G02B 3/02 |
| 2019/0154991 A1* | 5/2019 | Kim | ............ | G02B 1/007 |
| 2019/0187442 A1* | 6/2019 | Jia | ............ | G02B 9/64 |
| 2020/0301105 A1* | 9/2020 | Jung | ............ | G02B 21/36 |
| 2023/0185061 A1* | 6/2023 | Wang | ............ | G02B 9/62 |
| | | | | 359/713 |

FOREIGN PATENT DOCUMENTS

| | | | | |
|---|---|---|---|---|
| CN | 106199922 A * | 12/2016 | ............ | G02B 13/06 |
| CN | 106291886 A | 1/2017 | | |
| CN | 106772951 A | 5/2017 | | |
| CN | 107450159 A | 12/2017 | | |
| CN | 206906683 U | 1/2018 | | |
| CN | 107966798 A | 4/2018 | | |
| KR | 10-2017-0108666 A | 9/2017 | | |

OTHER PUBLICATIONS

Gross, Herbert et al. "Handbook of Optical Systems vol. 3: Aberration Theory and Correction of Optical Systems" Weinheim Germany, WILEY-VCH Verlag Gmbh & Co. 2007, pp. 377-379. (Year: 2007).*
First Office Action in Corresponding Chinese Application No. 201810538155.9, mailed Oct. 10, 2020; 10 pgs.
First Office Action in Corresponding Chinese Application No. 201810538165.2, mailed Oct. 10, 2020; 11 pgs.
International Search Report in Corresponding International Application No. PCT/CN2019/079985, mailed Jul. 4, 2019; 4 pgs.
International Search Report issued in corresponding International Application No. PCT/CN2019/079985, mailed Jul. 4, 2019; 6 pgs.

* cited by examiner

OPTICAL LENS ASSEMBLY

CROSS-REFERENCE TO RELATED APPLICATIONS

The present patent application is a continuation of International Application No. PCT/CN2019/079985, filed on Mar. 28, 2019, which claims benefit of priority to Chinese Patent Application No. 201810538155.9 entitled "Optical Lens Assembly" filed on May 30, 2018 before the China National Intellectual Property Administration and Chinese Patent Application No. 201810538165.2 entitled "Optical Lens Assembly" filed on May 30, 2018 before the China National Intellectual Property Administration. All of the aforementioned patent applications are hereby incorporated by reference in their entireties.

TECHNICAL FIELD

The present disclosure relates to an optical lens assembly, and more specifically, relates to an optical lens assembly including seven lenses.

BACKGROUND

The development of on-board lens assemblies has entered a critical moment. The market has put forward higher and higher requirements on the resolution of on-board lens assemblies. Wide-angle lenses assemblies commonly used in the market already have high resolution, such as 2M/4M or even 8M/12M. It is difficult to improve the resolution of the lenses assemblies while satisfying the small front end aperture and low cost. The cost of adding molded lenses to the basic structure is too high, so plastic aspheric surfaces are generally added. However, due to the limitation of the nature of the plastic material, when too many plastic lenses are used, excessive aberrations in a high or a low temperature environment will occur. Since the environment in which the on-board lens assemblies practical applied is relatively harsh, it is extremely critical to improve the stability of the resolution of the glass-plastic combined lens assemblies in a high or a low temperature environment.

SUMMARY

The present disclosure provides an optical lens assembly that is applicable to on-board installation and at least overcomes or partially overcomes at least one of the above deficiencies of the prior art.

In a first aspect, the present disclosure provides an optical lens assembly which may include a first lens, a second lens, a third lens, a fourth lens, a fifth lens, a sixth lens and a seventh lens, sequentially from an object side to an imaging side along an optical axis. The first lens may have negative refractive power, a convex object-side surface and a concave image-side surface. The second lens may have negative refractive power, a convex object-side surface and a concave image-side surface. The third lens may have positive refractive power, a convex object-side surface and a convex image-side surface. The fourth lens may have negative refractive power and a concave image-side surface. The seventh lens may have positive refractive power, a convex object-side surface and a convex image-side surface.

In one embodiment, the fifth lens and the sixth lens may be cemented to form a cemented lens.

In one embodiment, the fifth lens may have positive refractive power, and both of an object-side surface and an image-side surface of the fifth lens may be convex.

In one embodiment, the sixth lens may have negative refractive power, an object-side surface thereof may be concave, and an image-side surface thereof may be convex.

In one embodiment, a refractive index of a material of the first lens may be equal to or greater than 1.65.

In one embodiment, at least four lenses among the first to the seventh lenses may be aspheric lenses. Optionally, the second lens, the fourth lens and the seventh lens may all be aspheric lenses.

In one embodiment, the optical lens assembly may satisfy: D/h/FOV≤0.025, where FOV is a maximum field-of-view of the optical lens assembly, D is a maximum effective aperture diameter of the object-side surface of the first lens corresponding to the maximum field-of-view of the optical lens assembly, and h is an image height corresponding to the maximum field-of-view of the optical lens assembly.

In one embodiment, the optical lens assembly may satisfy: BFL/TTL≥0.1, where BFL is a distance along the optical axis from a center of the image-side surface of the seventh lens to an imaging plane of the optical lens assembly, and TTL is a distance along the optical axis from a center of the object-side surface of the first lens to the imaging plane of the optical lens assembly.

In one embodiment, the optical lens assembly may satisfy: TTL/h/FOV≤0.025, where TTL is a distance along the optical axis from a center of the object-side surface of the first lens to an imaging plane of the optical lens assembly, h is an image height corresponding to a maximum field-of-view of the optical lens assembly, and FOV is the maximum field-of-view of the optical lens assembly.

In one embodiment, a radius of curvature r41 of an object-side surface of the fourth lens, a radius of curvature r42 of an image-side surface of the fourth lens and a center thickness d4 of the fourth lens may satisfy: 0.3≤(|r41|+d4)/|r42|≤2.2.

In a second aspect, the present disclosure provides an optical lens assembly which may include a first lens, a second lens, a third lens, a fourth lens, a fifth lens, a sixth lens and a seventh lens, sequentially from an object side to an imaging side along an optical axis. Each of the first lens, the second lens, the fourth lens and the sixth lens may have negative refractive power; and each of the third lens, the fifth lens and the seventh lens may have positive refractive power. The optical lens assembly may satisfy: TTL/h/FOV≤0.025, where TTL is a distance along the optical axis from a center of an object-side surface of the first lens to an imaging plane of the optical lens assembly; his an image height corresponding to a maximum field-of-view of the optical lens assembly; and FOV is the maximum field-of-view of the optical lens assembly.

In one embodiment, the object-side surface of the first lens may be convex, and an image-side surface of the first lens may be concave.

In one embodiment, the object-side surface of the second lens may be convex, and an image-side surface of the second lens may be concave.

In one embodiment, both of an object-side surface and an image-side surface of the third lens may be convex.

In one embodiment, an image-side surface of the fourth lens may be concave.

In one embodiment, the fifth lens and the sixth lens may be cemented to form a cemented lens.

In one embodiment, both of an object-side surface and an image-side surface of the fifth lens may be convex.

In one embodiment, the object-side surface of the sixth lens may be concave, and an image-side surface of the sixth lens may be convex.

In one embodiment, both of an object-side surface and an image-side surface of the seventh lens may be convex.

In one embodiment, a refractive index of a material of the first lens may be equal to or greater than 1.65.

In one embodiment, at least four lenses among the first to the seventh lenses may be aspheric lenses. Optionally, the second lens, the fourth lens and the seventh lens may all be aspheric lenses.

In one embodiment, the optical lens assembly may satisfy: D/h/FOV≤0.025, where FOV is a maximum field-of-view of the optical lens assembly, D is a maximum effective aperture diameter of the object-side surface of the first lens corresponding to the maximum field-of-view of the optical lens assembly, and h is an image height corresponding to the maximum field-of-view of the optical lens assembly.

In one embodiment, the optical lens assembly may satisfy: BFL/TTL≥0.1, where BFL is a distance along the optical axis from a center of the image-side surface of the seventh lens to an imaging plane of the optical lens assembly, and TTL is a distance along the optical axis from a center of the object-side surface of the first lens to the imaging plane of the optical lens assembly.

In one embodiment, a radius of curvature r41 of an object-side surface of the fourth lens, a radius of curvature r42 of an image-side surface of the fourth lens and a center thickness d4 of the fourth lens may satisfy: 0.3≤(|r41|+d4)/|r42|≤2.2.

In a third aspect, the present disclosure provides an optical lens assembly including a first lens, a second lens, a third lens, a fourth lens, a fifth lens, a sixth lens and a seventh lens, sequentially from an object side to an imaging side along an optical axis. The first lens has negative refractive power, a convex object-side surface and a concave image-side surface. The second lens has negative refractive power, a convex object-side surface and a concave image-side surface. The third lens has positive refractive power, a convex object-side surface and a convex image-side surface. The fourth lens has positive refractive power, a convex object-side surface and a convex image-side surface. The seventh lens has positive refractive power, a convex object-side surface and a convex image-side surface.

In one embodiment, the fifth lens and the sixth lens may be cemented to form a cemented lens.

In one embodiment, the fifth lens may have positive refractive power, and both of an object-side surface and an image-side surface of the fifth lens may be convex.

In one embodiment, the sixth lens may have negative refractive power, an object-side surface thereof may be concave, and an image-side surface thereof may be convex.

In one embodiment, a refractive index of a material of the first lens may be equal to or greater than 1.65.

In one embodiment, at least four lenses among the first to the seventh lenses may be aspheric lenses. Optionally, the second lens, the fourth lens and the seventh lens may all be aspheric lenses.

In one embodiment, the optical lens assembly may satisfy: D/h/FOV≤0.025, where FOV is a maximum field-of-view of the optical lens assembly, D is a maximum effective aperture diameter of the object-side surface of the first lens corresponding to the maximum field-of-view of the optical lens assembly, and h is an image height corresponding to the maximum field-of-view of the optical lens assembly.

In one embodiment, the optical lens assembly may satisfy: BFL/TTL≥0.1, where BFL is a distance along the optical axis from a center of the image-side surface of the seventh lens to an imaging plane of the optical lens assembly, and TTL is a distance along the optical axis from a center of the object-side surface of the first lens to the imaging plane of the optical lens assembly.

In one embodiment, the optical lens assembly may satisfy: TTL/h/FOV≤0.025, where TTL is a distance along the optical axis from a center of the object-side surface of the first lens to an imaging plane of the optical lens assembly, h is an image height corresponding to a maximum field-of-view of the optical lens assembly; and FOV is the maximum field-of-view of the optical lens assembly.

In one embodiment, a radius of curvature r41 of an object-side surface of the fourth lens, a radius of curvature r42 of an image-side surface of the fourth lens and a center thickness d4 of the fourth lens may satisfy: 0.3≤(|r41|+d4)/|r42|≤2.2.

In a fourth aspect, the present disclosure provides an optical lens assembly including a first lens, a second lens, a third lens, a fourth lens, a fifth lens, a sixth lens and a seventh lens, sequentially from an object side to an imaging side along an optical axis. Each of the first lens, the second lens and the sixth lens has negative refractive power; and each of the third lens, the fourth lens, the fifth lens and the seventh lens has positive refractive power. The optical lens assembly satisfies: TTL/h/FOV≤0.025, where TTL is a distance along the optical axis from a center of an object-side surface of the first lens to an imaging plane of the optical lens assembly, h is an image height corresponding to a maximum field-of-view of the optical lens assembly, and FOV is the maximum field-of-view of the optical lens assembly.

In one embodiment, the object-side surface of the first lens may be convex, and an image-side surface of the first lens may be concave.

In one embodiment, the object-side surface of the second lens may be convex, and an image-side surface of the second lens may be concave.

In one embodiment, both of an object-side surface and an image-side surface of the third lens may be convex.

In one embodiment, both of an object-side surface and an image-side surface of the fourth lens may be convex.

In one embodiment, the fifth lens and the sixth lens may be cemented to form a cemented lens.

In one embodiment, both of an object-side surface and an image-side surface of the fifth lens may be convex.

In one embodiment, the object-side surface of the sixth lens may be concave, and an image-side surface of the sixth lens may be convex.

In one embodiment, both of an object-side surface and an image-side surface of the seventh lens may be convex.

In one embodiment, a refractive index of a material of the first lens may be equal to or greater than 1.65.

In one embodiment, at least four lenses among the first to the seventh lenses may be aspheric lenses. Optionally, the second lens, the fourth lens and the seventh lens may all be aspheric lenses.

In one embodiment, the optical lens assembly may satisfy: D/h/FOV≤0.025, where FOV is a maximum field-of-view of the optical lens assembly, D is a maximum effective aperture diameter of the object-side surface of the first lens corresponding to the maximum field-of-view of the optical lens assembly, and h is an image height corresponding to the maximum field-of-view of the optical lens assembly.

In one embodiment, the optical lens assembly may satisfy: BFL/TTL≥0.1, where BFL is a distance along the optical axis from a center of the image-side surface of the seventh lens to an imaging plane of the optical lens assembly, and TTL is a distance along the optical axis from a center of the object-side surface of the first lens to the imaging plane of the optical lens assembly.

In one embodiment, a radius of curvature r41 of an object-side surface of the fourth lens, a radius of curvature r42 of an image-side surface of the fourth lens and a center thickness d4 of the fourth lens may satisfy: $0.3 \leq (|r41|+d4)/|r42| \leq 2.2$.

Some of the above-mentioned embodiments of the present disclosure may employ, for example, seven lenses. By optimizing the shape of the lenses, rationally distributing the refractive power of each lens, and the like, at least one of the beneficial effects such as high resolution, miniaturization, low cost and small front end aperture is achieved. In addition, some or other embodiments of the above-mentioned embodiments in the present disclosure may also enable the optical lens assembly to achieve at least one of beneficial effects such as high resolution, miniaturization, low cost, small front end aperture, good resolution stability in a high or a low temperature environment, and the like.

BRIEF DESCRIPTION OF THE DRAWINGS

Other features, objects, and advantages of the present disclosure will become more apparent from the following detailed description of non-limiting embodiments, taken in conjunction with the accompanying drawings. In the drawings.

DETAILED DESCRIPTION OF EMBODIMENTS

Figure 1:
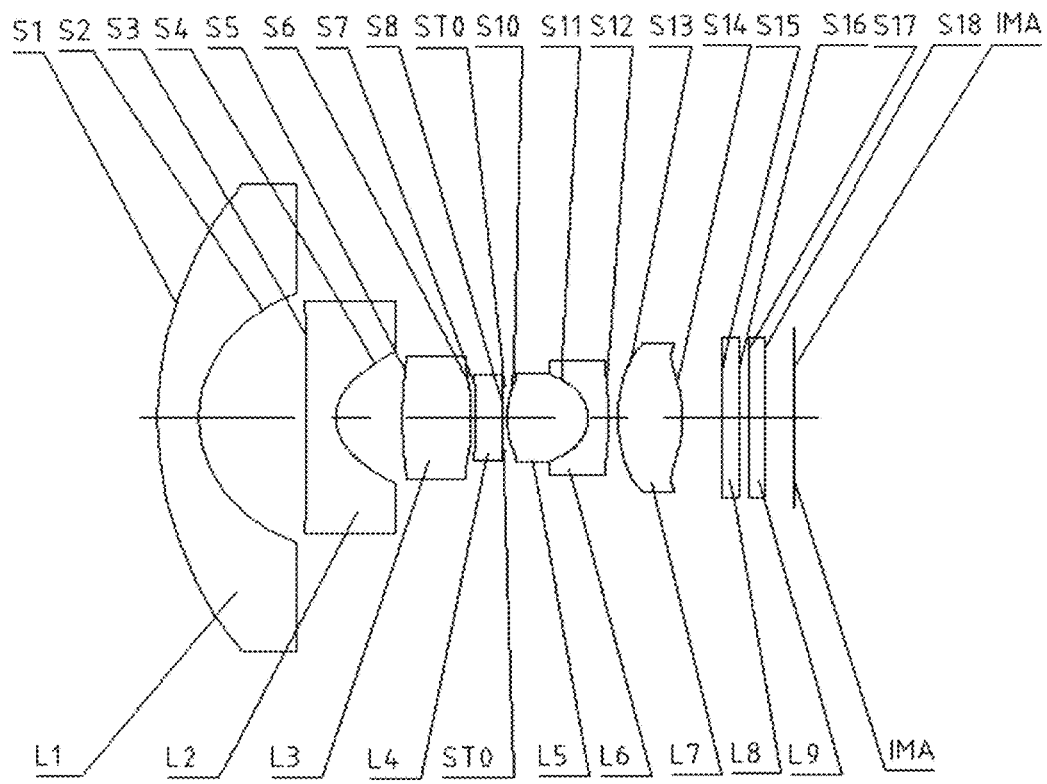
FIG. 1 illustrates a schematic structural view of an optical lens assembly according to Example 1 of the present disclosure.

For a better understanding of the present disclosure, various aspects of the present disclosure will be described in more detail with reference to the accompanying drawings. It should be understood that the detailed descriptions are merely used for describing exemplary embodiments of the present disclosure, but not intend to limit the scope of the present disclosure in any way. Throughout the specification, like reference numerals refer to like elements. The expression "and/or" includes any and all combinations of one or more of the associated listed items.

It should be noted that, in the present specification, the expressions such as first, second, third, etc., are merely used for distinguishing one feature from another feature without limiting the feature. Thus, a first lens discussed below may also be referred to as a second lens or a third lens, and a first cemented lens may also be referred to as a second cemented lens, without departing from the teachings of the present disclosure.

In the drawings, thicknesses, sizes and shapes of the lenses have been slightly exaggerated for ease of illustration. In particular, spherical or aspheric shapes shown in the drawings are shown by way of example. That is, spherical or aspheric shapes are not limited to the spherical or aspheric shapes shown in the drawings. The drawings are merely examples, and not strictly drawn to scale.

Herein, a paraxial region refers to the region near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave at least in the paraxial region. The surface of each lens closest to the object is referred to as an object-side surface, and the surface of each lens closest to the imaging plane is referred to as an image-side surface.

It should be further understood that the terms "comprising," "including," "having," "containing" and/or "contain," when used in the specification, specify the presence of stated features, elements, and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical lens assembly according to an exemplary embodiment of the present disclosure includes, for example, seven lenses having refractive power, i.e., a first lens, a second lens, a third lens, a fourth lens, a fifth lens, a sixth lens and a seventh lens. The seven lenses are arranged sequentially along an optical axis from an object side to an image side.

The optical lens assembly according to an exemplary embodiment of the present disclosure may further include a photosensitive element disposed on an imaging plane. Optionally, the photosensitive element disposed on the imaging plane may be a Charge-Coupled Device element (CCD) or a Complementary Metal-Oxide Semiconductor element (CMOS).

In an aspect, according to an embodiment of the present disclosure, the first lens may have negative refractive power, an object-side surface thereof may be convex and an image-side surface thereof may be concave. The first lens is configured as a meniscus shape having a convex surface toward the object side, which is benefit to collect the light within a large field of view as much as possible, and allow the collected light to enter the rear optical system. In practical applications, considering the outdoor environment for installing the on-board lens assembly, which may be in bad weather such as rain or snow, such meniscus shape configuration having a convex surface toward the object side is more suitable. The meniscus shape configuration helps to facilitate the sliding of water droplets, prevent the accumulation of water and dust, and thus reduce the influence of the external environment on imaging.

The second lens may have negative refractive power, an object-side surface thereof may be convex, and an image-side surface thereof may be concave. The second lens may transition smoothly the light passing through the first lens. Advantageously, shaping the image-side surface of the second lens to be concave may reduce the distance between the first lens and the second lens, which makes it easier to shorten the physical length of the lens assembly and achieve miniaturization characterization.

The third lens may have positive refractive power, and both of an object-side surface and an image-side surface thereof may be convex. The third lens may converge light, so that the divergent light may enter the rear optical system smoothly after being converged.

The fourth lens may have negative refractive power, an object-side surface thereof optionally may be convex or concave, and an image-side surface thereof may be concave. The fourth lens may smoothly transition light.

The fifth lens may have positive refractive power, and both of an object-side surface and an image-side surface thereof may be convex.

The sixth lens may have negative refractive power, an object-side surface thereof may be concave, and an image-side surface thereof may be convex.

The seventh lens may have positive refractive power, and both of an object-side surface and an image-side surface thereof may be convex. The seventh lens is a converging lens. The seventh lens may converge light appropriately to facilitate the matching between the lens assembly and the chip.

As known to those skilled in the art, cemented lenses may be used to minimize or eliminate chromatic aberration. Using a cemented lens in an optical lens assembly may improve image quality and reduce reflection losses of light energy, thereby improving the sharpness of the lens assembly. In addition, the use of a cemented lens may also simplify the assembly procedure in the lens assembly manufacturing process.

In an exemplary embodiment, the fifth lens and the sixth lens may be formed into a cemented lens by cementing the image-side surface of the fifth lens with the object-side surface of the sixth lens. By introducing the cemented lens consisting of the fifth lens and the sixth lens, it may help eliminate the chromatic aberration, reduce field curvature, and correct coma. Meanwhile, the cemented lens may also remain a part of chromatic aberration to compensate the overall chromatic aberration of the optical system. By cementing of the lenses, the air gap between the two lenses are omitted, thereby making the overall structure of the optical system compact and meeting the requirements of miniaturization.

In the cemented lens, the fifth lens near the object side has positive refractive power, and the sixth lens near the image side has negative refractive power. Such configuration is advantageous for further converging the light passing through the fourth lens and then transitioning the light to the rear optical system, which is advantageous for reducing the aperture diameter/size of the rear end of the lens assembly and reducing the total length of the system, and thereby achieving a short TTL.

In an exemplary embodiment, a stop for limiting the light beam may be disposed between, for example, the fourth lens and the fifth lens to further improve the imaging quality of the lens assembly. When the stop is disposed between the fourth lens and the fifth lens, the light in the front and rear of the stop may be converged effectively, the total length of the optical system may be shortened, and the aperture of the front and rear lens groups may be reduced.

In an exemplary embodiment, a maximum field-of-view FOV of the optical lens assembly, a maximum effective aperture diameter D of an object-side surface of a first lens corresponding to the maximum field-of-view of the optical lens assembly, and an image height h corresponding to the maximum field-of-view of the optical lens assembly may satisfy: $D/h/FOV \leq 0.025$. More desirable, D, h and FOV may further satisfy $D/h/FOV \leq 0.02$. Satisfying the conditional expression $D/h/FOV \leq 0.025$ may ensure a small front end aperture of the lens assembly.

In an exemplary embodiment, an optical back focus length BFL of the optical lens assembly and a total track length TTL of the optical lens assembly may satisfy $BFL/TTL \geq 0.1$. More desirable, BFL and TTL may further satisfy $BFL/TTL \geq 0.13$. Setting the back focus length to satisfy $BFL/TTL \geq 0.1$ and combining the overall structure of the optical lens assembly may facilitate the assembly of the optical lens assembly.

In an exemplary embodiment, a total track length TTL of the optical lens assembly, a maximum field-of-view FOV of the optical lens assembly and an image height h corresponding to the maximum field-of-view of the optical lens assembly may satisfy $TTL/h/FOV \leq 0.025$. More desirable, TTL, FOV and h may further satisfy $TTL/h/FOV \leq 0.02$. Compared with other traditional lenses, satisfying the conditional expression $TTL/h/FOV \leq 0.025$ may achieve a shorter TTL under the same field of view and the same imaging plane, thereby realizing the miniaturization of the lens.

In an exemplary embodiment, a radius of curvature r41 of an object-side surface of the fourth lens, a radius of curvature r42 of an image-side surface of the fourth lens and a center thickness d4 of the fourth lens may satisfy $0.3 \leq (|r41|+d4)/|r42| \leq 2.2$. More desirable, $0.7 \leq (|r41|+d4)/|r42| \leq 1.9$ may be further satisfied. The shape configuration of the fourth lens is advantageous for shortening the total optical length of the system, reducing the chromatic aberration of the system and improving the imaging quality. Meanwhile, the shape configuration and refractive power selection of the fourth lens are beneficial to coordinate the thermal compensation generated by the entire optical system.

In an exemplary embodiment, a first lens may be formed by a material having a high refractive index. Specifically, for example, a refractive index of the material of the first lens may be greater than or equal to 1.65. More desirable, the refractive index of the material of the first lens may be greater than or equal to 1.7. Such configuration is advantageous for reducing the front end aperture of the lens assembly and improving the imaging quality.

In an exemplary embodiment, the optical lens assembly according to the present disclosure has at least four aspheric lenses. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. By using an aspheric lens, the aberrations that occur during imaging may be eliminated as much as possible, and thus improving the image quality. For example, the first lens may be an aspheric lens, which may improve resolution quality and reduce the front end aperture of the lens assembly. The second lens may be an aspheric lens. The second lens may eliminate part of chromatic aberration and converge peripheral light, which helps the light passing through the first lens to transition smoothly. The seventh lens may be an aspheric lens, and the values of the center curvature radius of the object-side surface and the image-side surface of the seventh lens are relatively close. At the same time, with the treatment of the light at the edge of the lens, it is beneficial to adjust the light appropriately, increase the image height, and match the large-size chip. In addition, the seventh lens being an aspheric lens may reduce the length of the optical path of the peripheral light to an imaging plane, correct off-axis point aberration of the system, and optimize optical properties such as distortion and CRA. More desirable, the second lens, the fourth lens, and the seventh lens are all aspheric lenses.

In an exemplary embodiment, each of the lenses used in the optical lens assembly may be a plastic lens or a glass lens. Since plastic lenses have a large thermal expansion coefficient, plastic lenses will have a greater impact on variation of BFL when the ambient temperature in which the lens assembly is located changes greatly. Using glass lenses may reduce the impact on the BFL caused by temperature. The first lens according to the present disclosure may be a glass lens, so as to enhance the performance of the optical lens assembly in a high or a low temperature environment, reduce the influence of the environment on the entire system, and improve the overall performance of the optical lens assembly. Furthermore, the first lens may be an aspheric lens formed by glass to further improve the imaging quality and reduce the front end aperture. In an exemplary embodiment, the third lens of the optical lens assembly according to the present disclosure may be a glass lens.

By optimally setting the lens shape and reasonably distributing the refractive power, the optical lens assembly according to the above embodiments of the present disclosure may have a small front end aperture and a shorter TTL and may have high resolution while ensuring the miniaturization of the lens assembly. In the case that the same resolution capability is improved, the optical lens assembly according to the disclosure may reduce costs compared with an optical lens assembly that must use glass aspheric surfaces. In addition, the fourth lens of the optical lens assembly may have negative refractive power to further enhance the thermal compensation. The disclosure employing seven lenses may maintain stability of high-resolution in a high or a low temperature environment, and may well adapt to the using requirements of the vehicle environment.

In another aspect, according to an embodiment of the present disclosure, the first lens may have negative refractive power, an object-side surface thereof may be convex and an image-side surface thereof may be concave. The first lens is configured as a meniscus shape having a convex surface toward the object side to collect the light within a large field of view as much as possible, and to allow light to enter the rear optical system. In practical applications, considering the outdoor environment for installing the on-board lens assembly, which may be in bad weather such as rain or snow, such meniscus shape configuration having a convex surface toward the object side is more suitable. The meniscus shape configuration helps to facilitate the sliding of water droplets, prevent the accumulation of water and dust and thus reduce the influence of the external environment on imaging.

The second lens may have negative refractive power, an object-side surface thereof may be convex, and an image-side surface thereof may be concave. The second lens may transition smoothly the light passing through the first lens. Advantageously, shaping the image-side surface of the second lens to be concave may reduce the distance between the first lens and the second lens, which makes it easier to shorten the physical length of the lens assembly and achieve miniaturization characterization.

The third lens may have positive refractive power, and both of an object-side surface and an image-side surface thereof may be convex. The third lens may converge light, so that the divergent light may enter the rear optical system smoothly after being converged.

The fourth lens may have positive refractive power, and both of an object-side surface and an image-side surface thereof may be convex. The fourth lens may smoothly transition light.

The fifth lens may have positive refractive power, and both of an object-side surface and an image-side surface thereof may be convex.

The sixth lens may have negative refractive power, an object-side surface thereof may be concave, and an image-side surface thereof may be convex.

The seventh lens may have positive refractive power, and both of an object-side surface and an image-side surface thereof may be convex. The seventh lens is a converging lens. The seventh lens may converge light appropriately to facilitate the matching between the lens assembly and the chip.

As known to those skilled in the art, cemented lenses may be used to minimize or eliminate chromatic aberration. Using a cemented lens in an optical lens assembly may improve image quality and reduce reflection losses of light energy, thereby improving the sharpness of the lens assembly. In addition, the use of a cemented lens may also simplify the assembly procedure in the lens assembly manufacturing process.

In an exemplary embodiment, the fifth lens and the sixth lens may be formed into a cemented lens by cementing the image-side surface of the fifth lens with the object-side surface of the sixth lens. By introducing the cemented lens consisting of the fifth lens and the sixth lens, it may help eliminate the chromatic aberration, reduce field curvature, and correct coma. Meanwhile, the cemented lens may also remain a part of chromatic aberration to compensate the overall chromatic aberration of the optical system. By cementing of the lenses, the air gap between the two lenses are omited, thereby making the overall structure of the optical system compact and meeting the requirements of miniaturization.

In the cemented lens, the fifth lens near the object side has positive refractive power, and the sixth lens near the image side has negative refractive power. Such configuration is advantageous for further converging the light passing through the fourth lens and then transitioning the light to the rear optical system, which is advantageous for reducing the aperture diameter/size of the rear end of the lens assembly and reducing the total length of the system, and thereby achieving a short TTL.

In an exemplary embodiment, a stop for limiting the light beam may be disposed between, for example, the fourth lens and the fifth lens to further improve the imaging quality of the lens assembly. When the stop is disposed between the fourth lens and the fifth lens, the light in the front and rear of the stop may be converged effectively, the total length of the optical system may be shortened, and the aperture of the front and rear lens groups may be reduced.

In an exemplary embodiment, a maximum field-of-view FOV of the optical lens assembly, a maximum effective aperture diameter D of an object-side surface of a first lens corresponding to the maximum field-of-view of the optical lens assembly, and an image height h corresponding to the maximum field-of-view of the optical lens assembly may satisfy: D/h/FOV≤0.025. More desirable, D, h and FOV may further satisfy D/h/FOV≤0.02. Satisfying the conditional expression D/h/FOV≤0.025 may ensure a small front end aperture of the lens assembly.

In an exemplary embodiment, an optical back focus length BFL of the optical lens assembly and the total track length TTL of the optical lens assembly may satisfy BFL/TTL≥0.1. More desirable, BFL and TTL may further satisfy BFL/TTL≥0.12. Setting the back focus length to satisfy BFL/TTL≥0.1 and combining the overall structure of the optical lens assembly may facilitate the assembly of the optical lens assembly.

In an exemplary embodiment, a total track length TTL of the optical lens assembly, a maximum field-of-view FOV of the optical lens assembly and an image height h corresponding to the maximum field-of-view of the optical lens assembly may satisfy TTL/h/FOV≤0.025. More desirable, TTL, FOV and h may further satisfy TTL/h/FOV≤0.02. Compared with other traditional lenses, satisfying the conditional expression TTL/h/FOV≤0.025 may achieve a shorter TTL under the same field of view and the same imaging plane, thereby realizing the miniaturization of the lens.

In an exemplary embodiment, a radius of curvature r41 of an object-side surface of the fourth lens, a radius of curvature r42 of an image-side surface of the fourth lens, and a center thickness d4 of the fourth lens may satisfy 0.3≤(|r41|+d4)/|r42|≤2.2. More desirable, 0.5≤(|r41|+d4)/|r42|≤1.1 may be further satisfied. The shape configuration of the fourth lens is advantageous for shortening the total optical length of the system, reducing the chromatic aberration of the system and improving the imaging quality. Meanwhile the shape configuration and refractive power selection of the fourth lens may be beneficial to improve the resolution of the optical lens assembly.

In an exemplary embodiment, a first lens may be formed by a material having a high refractive index. Specifically, for example, a refractive index of the material of the first lens may be greater than or equal to 1.65. More desirable, the refractive index of the material of the first lens may be greater than or equal to 1.7. Such configuration is advantageous for reducing the front end aperture of the lens assembly and improving the imaging quality.

In an exemplary embodiment, the optical lens assembly according to the present disclosure has at least four aspheric lenses. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. By using an aspheric lens, the aberrations that occur during imaging may be eliminated as much as possible, and thus improving the image quality. For example, the first lens may be an aspheric lens, which may improve resolution quality and reduce the front end aperture of the lens assembly. The second lens may be an aspheric lens. The second lens may eliminate part of chromatic aberration and converge peripheral light, which helps the light passing through the first lens to transition smoothly. The seventh lens may be an aspheric lens, and the values of the center curvature radius of the object-side surface and the image-side surface of the seventh lens are relatively close. At the same time, with the treatment of the light at the edge of the lens, it is beneficial to adjust the light appropriately, increase the image height, and match the large-size chip. In addition, the seventh lens being an aspheric lens may reduce the length of the optical path of the peripheral light to an imaging plane, correct off-axis point aberration of the system, and optimize optical properties such as distortion and CRA. More desirable, the second lens, the fourth lens, and the seventh lens are all aspheric lenses.

In an exemplary embodiment, each of the lenses used in the optical lens assembly may be a plastic lens or a glass lens. Since plastic lenses have a large thermal expansion coefficient, plastic lenses will have a greater impact on variation of BFL when the ambient temperature in which the lens assembly is located changes greatly. Using glass lenses may reduce the impact on the BFL caused by temperature. The first lens according to the present disclosure may be a glass lens, so as to enhance the performance of the optical lens assembly in a high or a low temperature environment, reduce the influence of the environment on the entire system, and improve the overall performance of the optical lens assembly. Furthermore, the first lens may be an aspheric lens formed by glass to further improve the imaging quality and reduce the front end aperture. In an exemplary embodiment, the third lens of the optical lens assembly according to the present disclosure may be a glass lens.

By optimally setting the lens shape and reasonably distributing the refractive power, the optical lens assembly according to the above embodiments of the present disclosure may have a small front end aperture and a shorter TTL and may have high resolution while ensuring the miniaturization of the lens assembly. In the case that the same resolution capability is improved, the optical lens assembly according to the disclosure may reduce costs compared with an optical lens assembly that must use glass aspheric surfaces. In addition, the fourth lens of the optical lens assembly may have positive refractive power to further improve resolution. The disclosure employing seven lenses may maintain stability of high-resolution in a high or a low temperature environment, and may well adapt to the using requirements of the vehicle environment.

However, it will be understood by those skilled in the art that the number of lenses constituting the lens assembly may be varied to achieve the various results and advantages described in this specification without departing from the technical solution claimed by the present disclosure. For example, although the embodiment is described by using seven lenses as an example, the optical lens assembly is not limited to include seven lenses. The optical lens assembly may also include other numbers of lenses if desired.

Some specific examples of an optical lens assembly applicable to the above embodiment will be further described below with reference to the accompanying drawings.

EXAMPLE 1

An optical lens assembly according to Example 1 of the present disclosure is described below with reference to FIG. 1. FIG. 1 is a schematic structural view showing an optical lens assembly according to Example 1 of the present disclosure.

As shown in FIG. 1, the optical lens assembly includes a first lens L1, a second lens L2, a third lens L3, a fourth lens L4, a fifth lens L5, a sixth lens L6 and a seventh lens L7, which are arranged sequentially along an optical axis from an object side to an imaging side of the optical lens assembly.

The first lens L1 is a meniscus lens having negative refractive power, an object-side surface S1 thereof is convex, and an image-side surface S2 thereof is concave. The second lens L2 is a meniscus lens having negative refractive power, an object-side surface S3 thereof is convex, and an image-side surface S4 thereof is concave. The third lens L3 is a biconvex lens having positive refractive power, and both of an object-side surface S5 and an image-side surface S6 thereof are convex. The fourth lens L4 is a biconcave lens having negative refractive power, and both of an object-side surface S7 and an image-side surface S8 thereof are concave. The fifth lens L5 is a biconvex lens having positive refractive power, and both of an object-side surface S10 and an image-side surface S11 thereof are convex. The sixth lens L6 is a meniscus lens having negative refractive power, an object-side surface S11 thereof is concave, and an image-side surface S12 thereof is convex. The fifth lens L5 and the sixth lens L6 are cemented together to form a cemented lens. The seventh lens L7 is a biconvex lens having positive refractive power, and both of an object-side surface S13 and an image-side surface S14 thereof are convex.

In the present example, the second lens L2, the fourth lens L4, the fifth lens L5, the sixth lens L6 and the seventh lens L7 are all aspheric lenses, and the respective object-side surfaces and image-side surfaces thereof are aspheric surfaces.

Optionally, the optical lens assembly may further include an optical filter L8 having an object-side surface S15 and an image-side surface S16 and a protective lens L9 having an object-side surface S17 and an image-side surface S18. The optical filter L8 may be used to correct color deviations. The protective lens L9 may be used to protect an image sensor chip located on an imaging plane IMA. Light from an object sequentially passes through the surfaces S1 to S18 and is finally imaged on the imaging plane IMA.

In the optical lens assembly of the present example, a stop STO may be disposed between the fourth lens L4 and the fifth lens L5 (i.e., between the fourth lens L4 and the cemented lens) to improve image quality.

Table 1 shows the radius of curvature R, the thickness T, the refractive index Nd, and the Abbe number Vd of each lens of the optical lens assembly of Example 1, wherein the units of the radius of curvature R and the thickness T are both millimeters (mm).

TABLE 1

| Surface No. | Radius of Curvature R | Thickness T | Refractive Index Nd | Abbe Number Vd |
|---|---|---|---|---|
| S1 | 12.0000 | 1.1275 | 1.77 | 49.6 |
| S2 | 4.0000 | 2.8003 | | |
| S3 | 54.4000 | 0.8300 | 1.51 | 57.0 |
| S4 | 1.4600 | 1.9000 | | |
| S5 | 11.6000 | 1.8900 | 1.92 | 20.9 |
| S6 | −6.7000 | 0.1000 | | |
| S7 | −18.9000 | 0.7000 | 1.51 | 57.0 |
| S8 | 11.5000 | 0.0500 | | |
| STO | Infinite | 0.1000 | | |
| S10 | 3.6000 | 2.2000 | 1.53 | 56.1 |
| S11 | −1.3000 | 0.5500 | 1.64 | 23.5 |
| S12 | −16.0000 | 0.2600 | | |
| S13 | 4.0000 | 1.8000 | 1.53 | 56.1 |
| S14 | −3.8000 | 1.0500 | | |
| S15 | Infinite | 0.5500 | 1.52 | 64.2 |
| S16 | Infinite | 0.2000 | | |
| S17 | Infinite | 0.4000 | 1.52 | 64.2 |
| S18 | Infinite | 0.8200 | | |
| IMA | Infinite | | | |

The present example employs seven lenses as an example. By properly distributing the refractive power and surface type of each lens, the center thickness of each lens, and the air gap between the lenses, the lens assembly may have at least one of the beneficial effects of miniaturization, high resolution, low cost, and small front end aperture. The surface types Z of each aspheric is defined by the following formula:

$$Z(h) = \frac{ch^2}{1+\sqrt{1-(k+1)c^2h^2}} + Ah^4 + Bh^6 + Ch^8 + Dh^{10} + Eh^{12} \quad (1)$$

Where, Z is the sag—the axis-component of the displacement of the surface from the aspheric vertex, when the surface is at height h from the optical axis; c is a paraxial curvature of the aspheric, c=1/R (that is, the paraxial curvature c is a reciprocal of the radius of curvature R in the above Table 1); k is a conic coefficient; and A, B, C, D, E are high-order coefficients. Table 2 below shows the conic coefficient k and the high-order coefficients A, B, C, D and E applicable to aspheric surfaces S3-S4, S7-S8 and S10-S14 in Example 1.

TABLE 2

| Surface No. | K | A | B | C | D | E |
|---|---|---|---|---|---|---|
| S3 | 144.7960 | 6.5174E−05 | −2.4829E−04 | 1.9021E−05 | −6.6327E−07 | 3.6893E−09 |
| S4 | −0.8729 | 1.5796E−02 | 3.4639E−04 | 1.5553E−04 | −1.9169E−04 | 3.5898E−06 |
| S7 | 99.7944 | −3.7576E−03 | −2.2886E−04 | −1.4361E−03 | −9.6578E−05 | 3.7072E−05 |
| S8 | −95.8771 | 3.1759E−03 | −4.3976E−03 | −6.3088E−03 | −2.5447E−03 | 5.9209E−03 |
| S10 | 2.8406 | 3.8452E−03 | −6.7443E−03 | 1.0638E−02 | −1.4587E−02 | 1.1203E−02 |
| S11 | −0.8390 | −6.4262E−02 | −2.6107E−02 | −4.0523E−02 | 2.5154E−02 | −2.8470E−03 |
| S12 | 1.3272 | −7.5228E−03 | 3.7562E−04 | 6.8737E−04 | 9.2191E−05 | −4.5149E−05 |
| S13 | −10.9189 | 3.8191E−04 | 1.8366E−03 | 7.2802E−05 | −1.4974E−05 | 2.4940E−06 |
| S14 | 0.6551 | 7.9904E−03 | 1.2200E−03 | 6.2564E−04 | −1.2549E−04 | 3.5042E−05 |

Table 3 below shows a total focal length F of the optical lens assembly, a refractive index Nd1 of a material of the first lens L1, a radius of curvature r41 of the object-side surface S7 of the third lens L4, a radius of curvature r42 of the image-side surface S8 of the third lens L4, a center thickness d4 of the third lens L4, a maximum effective aperture diameter D of the object-side surface S1 of the first lens L1 corresponding to a maximum field-of-view of the optical lens assembly, an image height h corresponding to the maximum field-of-view of the optical lens assembly, the maximum field-of-view FOV of the optical lens assembly, an optical back focus length BFL of the optical lens assembly (i.e. a distance along the optical axis from a center of the image-side surface S14 of the seventh lens L7, the last lens, to the imaging plane IMA) and a total track length TTL of the optical lens assembly (i.e. a distance along the optical axis from a center of the object-side surface S1 of the first lens L1 to the imaging plane IMA) in Example 1.

TABLE 3

| F (mm) | 1.357 | h (mm) | 5.9 |
|---|---|---|---|
| Nd1 | 1.77 | FOV (°) | 196 |
| |r41| (mm) | 18.900 | BFL (mm) | 3.020 |
| |r42| (mm) | 11.500 | TTL (mm) | 17.328 |
| d4 (mm) | 0.700 | | |
| D (mm) | 14.008 | | |

In the present example, the radius of curvature r41 of the object-side surface S7 of the third lens L4, the radius of curvature r42 of the image-side surface S8 of the third lens L4 and the center thickness d4 of the third lens L4 satisfy (|r41|+d4)/|r42|=1.704; the maximum field-of-view FOV of the optical lens assembly, the maximum effective aperture diameter D of the object-side surface S1 of the first lens L1 corresponding to the maximum field-of-view of the optical lens assembly and the image height h corresponding to the maximum field-of-view of the optical lens assembly satisfy D/h/FOV=0.012; the optical back focus length BFL of the optical lens assembly and the total track length TTL of the optical lens assembly satisfy BFL/TTL=0.174; and the total track length TTL of the optical lens assembly, the image height h corresponding to the maximum field-of-view of the optical lens assembly and the maximum field-of-view FOV of the optical lens assembly satisfy TTL/h/FOV=0.015.

EXAMPLE 2

Figure 2:
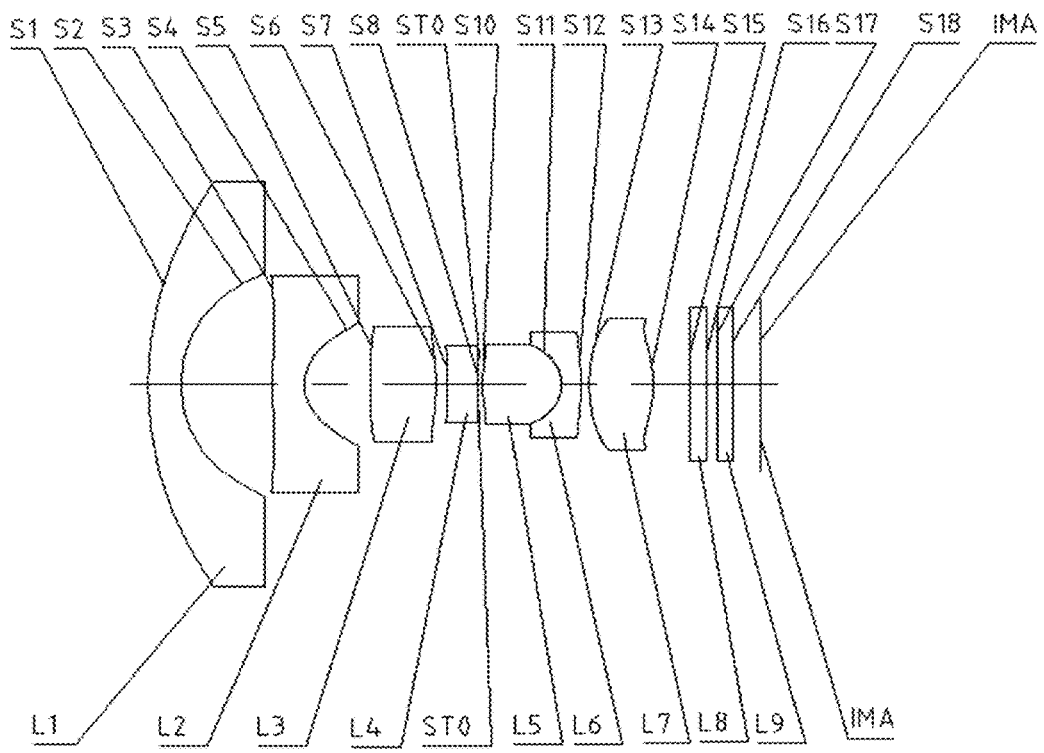
FIG. 2 illustrates a schematic structural view of an optical lens assembly according to Example 2 of the present disclosure.

An optical lens assembly according to Example 2 of the present disclosure is described below with reference to FIG. 2. In this example and the following examples, for the purpose of brevity, the description of parts similar to those in Example 1 will be omitted. FIG. 2 is a schematic structural view showing an optical lens assembly according to Example 2 of the present disclosure.

As shown in FIG. 2, the optical lens assembly includes a first lens L1, a second lens L2, a third lens L3, a fourth lens L4, a fifth lens L5, a sixth lens L6 and a seventh lens L7, which are arranged sequentially along an optical axis from an object side to an imaging side of the optical lens assembly.

The first lens L1 is a meniscus lens having negative refractive power, an object-side surface S1 thereof is convex, and an image-side surface S2 thereof is concave. The second lens L2 is a meniscus lens having negative refractive power, an object-side surface S3 thereof is convex, and an image-side surface S4 thereof is concave. The third lens L3 is a biconvex lens having positive refractive power, and both of an object-side surface S5 and an image-side surface S6 thereof are convex. The fourth lens L4 is a biconcave lens having negative refractive power, and both of an object-side surface S7 and an image-side surface S8 thereof are concave. The fifth lens L5 is a biconvex lens having positive refractive power, and both of an object-side surface S10 and an image-side surface S11 thereof are convex. The sixth lens L6 is a meniscus lens having negative refractive power, an object-side surface S11 thereof is concave, and an image-side surface S12 thereof is convex. The fifth lens L5 and the sixth lens L6 are cemented together to form a cemented lens. The seventh lens L7 is a biconvex lens having positive refractive power, and both of an object-side surface S13 and an image-side surface S14 thereof are convex.

In the present example, the second lens L2, the fourth lens L4, the fifth lens L5, the sixth lens L6 and the seventh lens L7 are all aspheric lenses, and the respective object-side surfaces and image-side surfaces thereof are aspheric surfaces.

Optionally, the optical lens assembly may further include a optical filter L8 having an object-side surface S15 and an image-side surface S16 and a protective lens L9 having an object-side surface S17 and an image-side surface S18. The optical filter L8 may be used to correct color deviations. The protective lens L9 may be used to protect an image sensor chip located on an imaging plane IMA. Light from an object sequentially passes through the surfaces S1 to S18 and is finally imaged on the imaging plane IMA.

In the optical lens assembly of the present example, a stop STO may be disposed between the fourth lens L4 and the fifth lens L5 (i.e., between the fourth lens L4 and the cemented lens) to improve image quality.

The present example employs seven lenses as an example. By properly distributing the refractive power and surface shape of each lens, the center thickness of each lens, and the air gap between the lenses, the lens assembly may have at least one of the beneficial effects of miniaturization, high resolution, low cost, and small front end aperture.

Table 4 shows the radius of curvature R, the thickness T, the refractive index Nd, and the Abbe number Vd of each lens of the optical lens assembly of Example 2, wherein the units of the radius of curvature R and the thickness T are both millimeters (mm). Table 5 below shows the conic coefficient k and the high-order coefficients A, B, C, D and E applicable to aspheric surfaces S3-S4, S7-S8 and S10-S14 in Example 2, wherein the surface type of each aspheric surface may be defined by the formula (1) given in the above Example 1. Table 6 below shows a total focal length F of the optical lens assembly, a refractive index Nd1 of a material of the first lens L1, a radius of curvature r41 of the object-side surface S7 of the fourth lens L4, a radius of curvature r42 of the image-side surface S8 of the fourth lens L4, a center thickness d4 of the fourth lens L4, a maximum effective aperture diameter D of the object-side surface S1 of the first lens L1 corresponding to a maximum field-of-view of the optical lens assembly, an image height h corresponding to the maximum field-of-view of the optical lens assembly, the maximum field-of-view FOV of the optical lens assembly, an optical back focus length BFL of the optical lens assembly (i.e. a distance along the optical axis from a center of the image-side surface S14 of the seventh lens L7, the last lens, to the imaging plane IMA) and a total track length TTL of the optical lens assembly (i.e. a distance along the optical axis from a center of the object-side surface S1 of the first lens L1 to the imaging plane IMA) in Example 2.

TABLE 4

| Surface No. | Radius of Curvature R | Thickness T | Refractive Index Nd | Abbe Number Vd |
|---|---|---|---|---|
| S1 | 11.7000 | 0.9500 | 1.80 | 46.8 |
| S2 | 3.8000 | 2.4000 | | |
| S3 | 79.6000 | 0.8800 | 1.53 | 56.1 |
| S4 | 1.5000 | 1.8700 | | |
| S5 | 14.3000 | 1.8900 | 1.92 | 20.9 |
| S6 | −7.4000 | 0.3000 | | |
| S7 | −138.0000 | 0.8700 | 1.53 | 56.1 |
| S8 | 179.0000 | 0.0500 | | |
| STO | Infinite | 0.1000 | | |
| S10 | 4.9000 | 2.2000 | 1.53 | 56.1 |
| S11 | −1.4000 | 0.5500 | 1.64 | 23.5 |
| S12 | −14.5000 | 0.2300 | | |
| S13 | 4.4500 | 1.8000 | 1.54 | 56.1 |
| S14 | −4.0000 | 1.0500 | | |
| S15 | Infinite | 0.5500 | 1.52 | 64.2 |
| S16 | Infinite | 0.2000 | | |
| S17 | Infinite | 0.4000 | 1.52 | 64.2 |
| S18 | Infinite | 0.8500 | | |
| IMA | Infinite | | | |

TABLE 5

| Surface No. | K | A | B | C | D | E |
|---|---|---|---|---|---|---|
| S3 | 180.1446 | 7.0676E−05 | −2.3805E−04 | 1.9866E−05 | −6.9437E−07 | 8.8680E−09 |
| S4 | −0.8771 | 1.4601E−02 | 6.9578E−04 | 1.7123E−04 | −2.1342E−04 | 2.6532E−05 |
| S7 | 0.0000 | −8.7260E−04 | 2.2247E−04 | −3.2305E−04 | −8.7352E−04 | 4.1854E−04 |
| S8 | 0.0000 | 1.2141E−03 | −1.0519E−03 | −3.5935E−03 | −1.7815E−03 | 2.1556E−03 |
| S10 | 3.7997 | 6.4386E−03 | 1.6123E−04 | 4.2961E−03 | −1.9540E−02 | 1.4457E−02 |
| S11 | −0.8956 | −7.5662E−02 | −4.3816E−03 | −3.5700E−03 | 1.7567E−02 | −4.0711E−03 |
| S12 | −1.2717 | −8.5874E−03 | 1.9570E−04 | 5.6150E−04 | 5.7667E−05 | −3.0692E−05 |
| S13 | −11.6688 | 1.3673E−03 | 2.0909E−03 | 1.0321E−04 | −1.0782E−05 | −1.1190E−06 |
| S14 | 0.4716 | 9.3275E−03 | 1.2388E−03 | 6.2593E−04 | −1.2209E−04 | 2.4840E−05 |

TABLE 6

| F (mm) | 1.313 | h (mm) | 5.0 |
|---|---|---|---|
| Nd1 | 1.80 | FOV (°) | 196 |
| |r41| (mm) | 138.000 | BFL (mm) | 3.050 |
| |r42| (mm) | 179.000 | TTL (mm) | 17.140 |
| d4 (mm) | 0.870 | | |
| D (mm) | 12.462 | | |

In the present example, the radius of curvature r41 of the object-side surface S7 of the fourth lens L4, the radius of curvature r42 of the image-side surface S8 of the fourth lens L4 and the center thickness d4 of the fourth lens L4 satisfy (|r41|+d4)/|r42|=0.776; the maximum field-of-view FOV of the optical lens assembly, the maximum effective aperture diameter D of the object-side surface S1 of the first lens L1 corresponding to the maximum field-of-view of the optical lens assembly and the image height h corresponding to the maximum field-of-view of the optical lens assembly satisfy D/h/FOV=0.013; the optical back focus length BFL of the optical lens assembly and the total track length TTL of the optical lens assembly satisfy BFL/TTL=0.178; and the total track length TTL of the optical lens assembly, the image height h corresponding to the maximum field-of-view of the optical lens assembly and the maximum field-of-view FOV of the optical lens assembly satisfy TTL/h/FOV=0.017.

EXAMPLE 3

Figure 3:
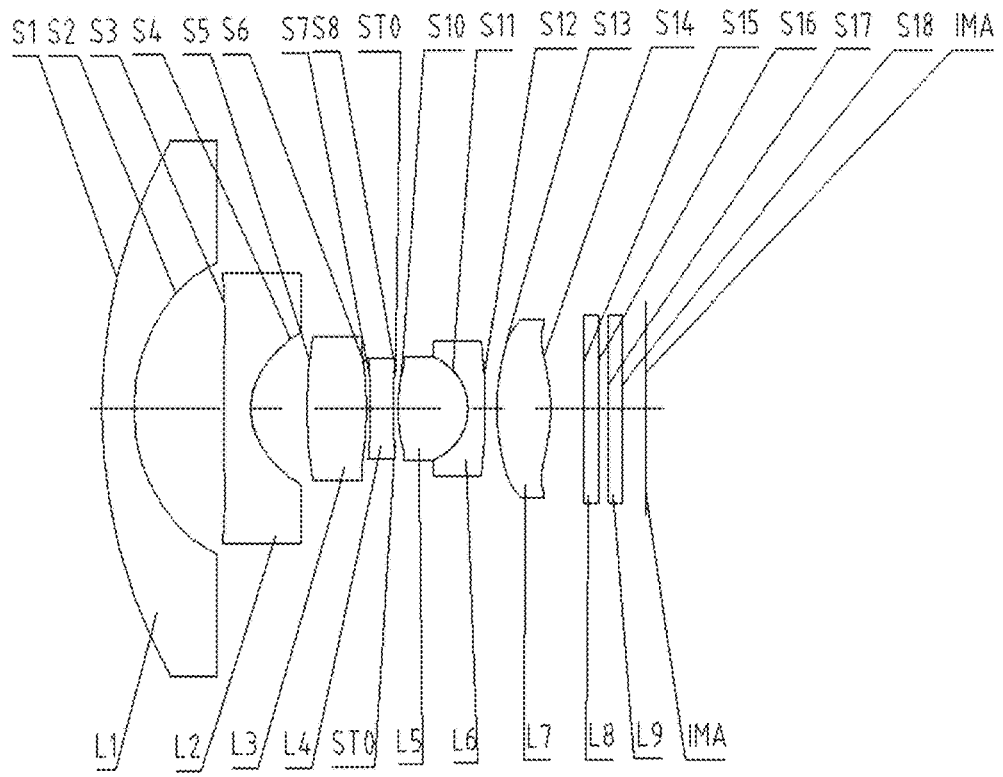
FIG. 3 illustrates a schematic structural view of an optical lens assembly according to Example 3 of the present disclosure.

An optical lens assembly according to Example 3 of the present disclosure is described below with reference to FIG. 3. FIG. 3 is a schematic structural view showing an optical lens assembly according to Example 3 of the present disclosure.

As shown in FIG. 3, the optical lens assembly includes a first lens L1, a second lens L2, a third lens L3, a fourth lens L4, a fifth lens L5, a sixth lens L6 and a seventh lens L7, which are arranged sequentially along an optical axis from an object side to an imaging side of the optical lens assembly.

The first lens L1 is a meniscus lens having negative refractive power, an object-side surface S1 thereof is convex and an image-side surface S2 thereof is concave. The second lens L2 is a meniscus lens having negative refractive power, an object-side surface S3 thereof is convex, and an image-side surface S4 thereof is concave. The third lens L3 is a biconvex lens having positive refractive power, and both of an object-side surface S5 and an image-side surface S6 thereof are convex. The fourth lens L4 is a biconcave lens having negative refractive power, and both of an object-side surface S7 and an image-side surface S8 thereof are concave. The fifth lens L5 is a biconvex lens having positive refractive power, and both of an object-side surface S10 and an image-side surface S11 thereof are convex. The sixth lens L6 is a meniscus lens having negative refractive power, an object-side surface S11 thereof is concave, and an image-side surface S12 thereof is convex. The fifth lens L5 and the sixth lens L6 are cemented together to form a cemented lens. The seventh lens L7 is a biconvex lens having positive refractive power, and both of an object-side surface S13 and an image-side surface S14 thereof are convex.

In the present example, the second lens L2, the fourth lens L4, the fifth lens L5, the sixth lens L6 and the seventh lens L7 are all aspheric lenses, and the respective object-side surfaces and image-side surfaces thereof are aspheric surfaces.

Optionally, the optical lens assembly may further include a optical filter L8 having an object-side surface S15 and an image-side surface S16 and a protective lens L9 having an object-side surface S17 and an image-side surface S18. The optical filter L8 may be used to correct color deviations. The protective lens L9 may be used to protect an image sensor chip located on an imaging plane IMA. Light from an object sequentially passes through the surfaces S1 to S18 and is finally imaged on the imaging plane IMA.

In the optical lens assembly of the present example, a stop STO may be disposed between the fourth lens L4 and the fifth lens L5 (i.e., between the fourth lens L4 and the cemented lens) to improve image quality.

The present example employs seven lenses as an example. By properly distributing the refractive power and surface shape of each lens, the center thickness of each lens, and the air gap between the lenses, the lens assembly may have at least one of the beneficial effects of miniaturization, high resolution, low cost, and small front end aperture.

Table 7 shows radius of curvature R, thickness T, refractive index Nd, and Abbe number Vd of each lens of the optical lens assembly of Example 3, wherein the units of the radius of curvature R and the thickness T are both millimeters (mm). Table 8 below shows the conic coefficient k and the high-order coefficients A, B, C, D and E applicable to aspheric surfaces S3-S4, S7-S8, and S10-14 in Example 3, wherein the surface type of each aspheric surface may be defined by the formula (1) given in the above Example 1. Table 9 below shows a total focal length F of the optical lens assembly, a refractive index Nd1 of a material of the first lens L1, a radius of curvature r41 of the object-side surface S7 of the fourth lens L4, a radius of curvature r42 of the image-side surface S8 of the fourth lens L4, a center thickness d4 of the fourth lens L4, a maximum effective aperture diameter D of the object-side surface S1 of the first lens L1 corresponding to a maximum field-of-view of the optical lens assembly, an image height h corresponding to the maximum field-of-view of the optical lens assembly, a maximum field-of-view FOV of the optical lens assembly, an optical back focus length BFL of the optical lens assembly (i.e. a distance along the optical axis from a center of the image-side surface S14 of the seventh lens L7, the last lens, to the imaging plane IMA) and a total track length TTL of the optical lens assembly (i.e. a distance along the optical axis from a center of the object-side surface S1 of the first lens L1 to the imaging plane IMA) in Example 3.

TABLE 7

| Surface No. | Radius of Curvature R | Thickness T | Refractive Index Nd | Abbe Number Vd |
|---|---|---|---|---|
| S1 | 11.8000 | 1.0000 | 1.77 | 49.6 |
| S2 | 4.0000 | 2.8000 | | |
| S3 | 57.0000 | 0.8600 | 1.51 | 57.0 |
| S4 | 1.5000 | 1.9000 | | |
| S5 | 11.6000 | 1.8900 | 1.92 | 20.9 |
| S6 | −6.8000 | 0.1000 | | |
| S7 | −20.0000 | 0.7000 | 1.51 | 57.0 |
| S8 | 11.1000 | 0.0050 | | |
| STO | Infinite | 0.1000 | | |
| S10 | 3.6000 | 2.2000 | 1.54 | 56.1 |
| S11 | −1.3000 | 0.5500 | 1.64 | 23.5 |
| S12 | −14.9000 | 0.3000 | | |
| S13 | 4.1500 | 1.7000 | 1.54 | 56.1 |
| S14 | −3.7000 | 1.0500 | | |
| S15 | Infinite | 0.5500 | 1.52 | 64.2 |
| S16 | Infinite | 0.1000 | | |
| S17 | Infinite | 0.4000 | 1.52 | 64.2 |
| S18 | Infinite | 0.9500 | | |
| IMA | Infinite | | | |

TABLE 8

| Surface No. | K | A | B | C | D | E |
|---|---|---|---|---|---|---|
| S3 | 146.2020 | 9.0840E−05 | −2.4868E−04 | 1.8880E−05 | −6.7321E−07 | 9.5429E−09 |
| S4 | −0.8818 | 1.4985E−02 | 4.0308E−04 | 1.4002E−04 | −1.9198E−04 | 1.0132E−05 |
| S7 | 95.8612 | −3.0058E−03 | 5.1820E−04 | −1.9007E−03 | −8.1632E−05 | 1.4521E−04 |
| S8 | −99.5624 | 3.5544E−03 | −3.4255E−03 | −6.8864E−03 | 1.0000E−05 | 3.7287E−03 |
| S10 | 2.5698 | 2.3997E−03 | −6.7708E−03 | 1.1009E−02 | −1.4434E−01 | 1.1024E−02 |
| S11 | −0.8230 | −6.6300E−02 | −2.2360E−02 | −3.9044E−02 | 2.4753E−02 | −1.1965E−03 |
| S12 | 8.1979 | −7.7873E−03 | 3.2569E−04 | 6.9049E−04 | 4.1945E−05 | −3.2958E−05 |
| S13 | −10.9002 | 7.9914E−04 | 1.8867E−03 | 7.0692E−05 | −1.6079E−05 | 4.3805E−06 |
| S14 | 0.5791 | 8.4326E−03 | 1.2698E−03 | 6.1964E−04 | −1.2480E−04 | 1.8948E−05 |

TABLE 9

| F (mm) | 1.342 | h (mm) | 5.4 |
|---|---|---|---|
| Nd1 | 1.77 | FOV (°) | 196 |
| |r41| (mm) | 20.000 | BFL (mm) | 3.050 |
| |r42| (mm) | 11.100 | TTL (mm) | 17.200 |

TABLE 9-continued

| d4 (mm) | 0.700 |
|---|---|
| D (mm) | 14.733 |

In the present example, the radius of curvature r41 of the object-side surface S7 of the fourth lens L4, the radius of curvature r42 of the image-side surface S8 of the fourth lens L4 and the center thickness d4 of the fourth lens L4 satisfy $(|r41|+d4)/|r42|=1.865$; the maximum field-of-view FOV of the optical lens assembly, the maximum effective aperture diameter D of the object-side surface S1 of the first lens L1 corresponding to the maximum field-of-view of the optical lens assembly and the image height h corresponding to the maximum field-of-view of the optical lens assembly satisfy $D/h/FOV=0.014$; the optical back focus length BFL of the optical lens assembly and the total track length TTL of the optical lens assembly satisfy $BFL/TTL=0.177$; and the total track length TTL of the optical lens assembly, the image height h corresponding to the maximum field-of-view of the optical lens assembly and the maximum field-of-view FOV of the optical lens assembly satisfy $TTL/h/FOV=0.016$.

EXAMPLE 4

Figure 4:
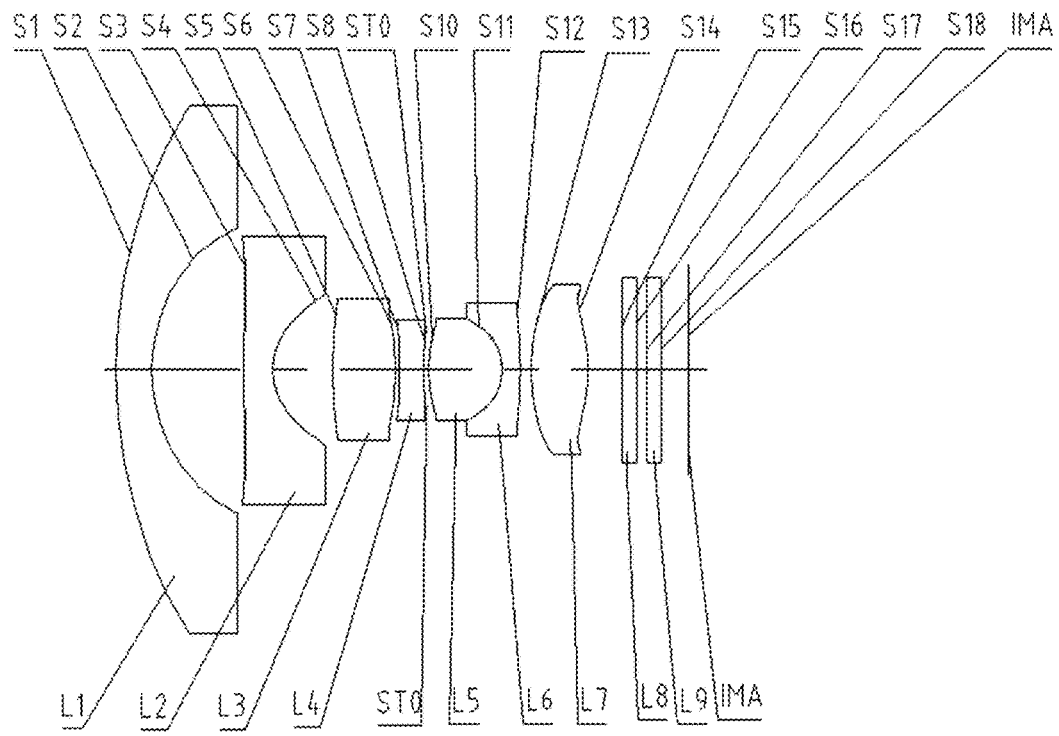
FIG. 4 illustrates a schematic structural view of an optical lens assembly according to Example 4 of the present disclosure.

An optical lens assembly according to Example 4 of the present disclosure is described below with reference to FIG. 4. In this example and the following examples, for the purpose of brevity, the description of parts similar to those in Example 1 will be omitted. FIG. 4 is a schematic structural view showing an optical lens assembly according to Example 4 of the present disclosure.

As shown in FIG. 4, the optical lens assembly includes a first lens L1, a second lens L2, a third lens L3, a fourth lens L4, a fifth lens L5, a sixth lens L6 and a seventh lens L7, which are arranged sequentially along an optical axis from an object side to an imaging side of the optical lens assembly.

The first lens L1 is a meniscus lens having negative refractive power, an object-side surface S1 thereof is convex, and an image-side surface S2 thereof is concave. The second lens L2 is a meniscus lens having negative refractive power, an object-side surface S3 thereof is convex, and an image-side surface S4 thereof is concave. The third lens L3 is a biconvex lens having positive refractive power, and both of an object-side surface S5 and an image-side surface S6 thereof are convex. The fourth lens L4 is a biconcave lens having negative refractive power, and both of an object-side surface S7 and an image-side surface S8 thereof are concave. The fifth lens L5 is a biconvex lens having positive refractive power, and both of an object-side surface S10 and an image-side surface S11 thereof are convex. The sixth lens L6 is a meniscus lens having negative refractive power, an object-side surface S11 thereof is concave, and an image-side surface S12 thereof is convex. The fifth lens L5 and the sixth lens L6 are cemented together to form a cemented lens. The seventh lens L7 is a biconvex lens having positive refractive power, and both of an object-side surface S13 and an image-side surface S14 thereof are convex.

In the present example, the second lens L2, the fourth lens L4, the fifth lens L5, the sixth lens L6 and the seventh lens L7 are all aspheric lenses, and the respective object-side surfaces and image-side surfaces thereof are aspheric surfaces.

Optionally, the optical lens assembly may further include a optical filter L8 having an object-side surface S15 and an image-side surface S16 and a protective lens L9 having an object-side surface S17 and an image-side surface S18. The optical filter L8 may be used to correct color deviations. The protective lens L9 may be used to protect an image sensor chip located on an imaging plane IMA. Light from an object sequentially passes through the surfaces S1 to S18 and is finally imaged on the imaging plane IMA.

In the optical lens assembly of the present example, a stop STO may be disposed between the fourth lens L4 and the fifth lens L5 (i.e., between the fourth lens L4 and the cemented lens) to improve image quality.

The present example employs seven lenses as an example. By properly distributing the refractive power and surface shape of each lens, the center thickness of each lens, and the air gap between the lenses, the lens assembly may have at least one of the beneficial effects of miniaturization, high resolution, low cost, and small front end aperture.

Table 10 shows the radius of curvature R, the thickness T, the refractive index Nd, and the Abbe number Vd of each lens of the optical lens assembly of Example 4, wherein the units of the radius of curvature R and the thickness T are both millimeters (mm). Table 11 below shows the conic coefficient k and the high-order coefficients A, B, C, D and E applicable to aspheric surfaces S3-S4, S7-S8, and S10-14 in Example 4, wherein the surface type of each aspheric surface may be defined by the formula (1) given in the above Example 1. Table 12 below shows a total focal length F of the optical lens assembly, a refractive index Nd1 of a material of the first lens L1, a radius of curvature r41 of the object-side surface S7 of the fourth lens L4, a radius of curvature r42 of the image-side surface S8 of the fourth lens L4, a center thickness d4 of the fourth lens L4, a maximum effective aperture diameter D of the object-side surface S1 of the first lens L1 corresponding to a maximum field-of-view of the optical lens assembly, an image height h corresponding to the maximum field-of-view of the optical lens assembly, the maximum field-of-view FOV of the optical lens assembly, an optical back focus length BFL of the optical lens assembly (i.e., a distance along the optical axis from a center of the image-side surface S14 of the seventh lens L7, the last lens, to the imaging plane IMA) and a total track length TTL of the optical lens assembly (i.e., a distance along the optical axis from a center of the object-side surface S1 of the first lens L1 to the imaging plane IMA) in Example 4.

TABLE 10

| Surface No. | Radius of Curvature R | Thickness T | Refractive Index Nd | Abbe Number Vd |
|---|---|---|---|---|
| S1 | 12.0000 | 1.0700 | 1.80 | 46.6 |
| S2 | 4.0000 | 2.7500 | | |
| S3 | 57.2000 | 0.8500 | 1.51 | 56.3 |
| S4 | 1.5000 | 1.8700 | | |
| S5 | 11.7000 | 1.8900 | 1.92 | 20.9 |
| S6 | −6.8000 | 0.1000 | | |
| S7 | −20.0000 | 0.7500 | 1.51 | 56.3 |
| S8 | 11.0000 | 0.0500 | | |
| STO | Infinite | 0.1000 | | |
| S10 | 3.6000 | 2.2000 | 1.54 | 56.0 |
| S11 | −1.3000 | 0.5500 | 1.64 | 23.5 |
| S12 | −15.0000 | 0.2900 | | |
| S13 | 4.0000 | 1.7100 | 1.54 | 56.0 |
| S14 | −3.8000 | 1.0500 | | |
| S15 | Infinite | 0.5500 | 1.52 | 64.2 |
| S16 | Infinite | 0.1000 | | |
| S17 | Infinite | 0.4000 | 1.52 | 64.2 |
| S18 | Infinite | 0.9500 | | |
| IMA | Infinite | | | |

TABLE 11

| Surface No. | K | A | B | C | D | E |
|---|---|---|---|---|---|---|
| S3 | 147.0342 | 9.0834E−05 | −2.4856E−04 | 1.8901E−05 | −1.3436E−06 | 9.4112E−09 |
| S4 | −0.8798 | 1.5156E−02 | 3.9523E−04 | 1.3745E−04 | −1.9255E−04 | 1.0019E−05 |
| S7 | 94.4058 | −2.9865E−03 | 4.9999E−04 | −1.8662E−03 | −1.5972E−04 | 1.3146E−04 |
| S8 | −100.2100 | 3.4323E−03 | −3.3855E−03 | −7.0055E−03 | −3.1314E−03 | 3.5899E−03 |
| S10 | 2.5592 | 2.4037E−03 | −6.9297E−03 | 1.0767E−02 | −1.4561E−02 | 5.7377E−03 |
| S11 | −0.8293 | −6.5733E−03 | −2.2381E−02 | −3.8960E−02 | 1.2466E−02 | −2.1671E−03 |
| S12 | 8.1224 | −7.7785E−03 | 3.2616E−04 | 6.9034E−04 | 8.4250E−05 | −3.2559E−05 |
| S13 | −10.9126 | 7.8084E−04 | 1.8841E−03 | 7.0703E−05 | −1.6101E−05 | 4.3761E−06 |
| S14 | 0.5766 | 8.4572E−03 | 1.2717E−03 | 6.2001E−04 | −1.2475E−04 | 1.8944E−05 |

TABLE 12

| F (mm) | 1.324 | h (mm) | 5.0 |
|---|---|---|---|
| Nd1 | 1.80 | FOV (°) | 196 |
| |r41| (mm) | 20.000 | BFL (mm) | 3.050 |
| |r42| (mm) | 11.000 | TTL (mm) | 17.230 |
| d4 (mm) | 0.750 | | |
| D (mm) | 13.126 | | |

In the present example, the radius of curvature r41 of the object-side surface S7 of the fourth lens L4, the radius of curvature r42 of the image-side surface S8 of the fourth lens L4 and the center thickness d4 of the fourth lens L4 satisfy (|r41|+d4)/|r42|=1.886; the maximum field-of-view FOV of the optical lens assembly, the maximum effective aperture diameter D of the object-side surface S1 of the first lens L1 corresponding to the maximum field-of-view of the optical lens assembly and the image height h corresponding to the maximum field-of-view of the optical lens assembly satisfy D/h/FOV=0.013; the optical back focus length BFL of the optical lens assembly and the total track length TTL of the optical lens assembly satisfy BFL/TTL=0.177; and the total track length TTL of the optical lens assembly, the image height h corresponding to the maximum field-of-view of the optical lens assembly and the maximum field-of-view FOV of the optical lens assembly satisfy TTL/h/FOV=0.018.

EXAMPLE 5

Figure 5:
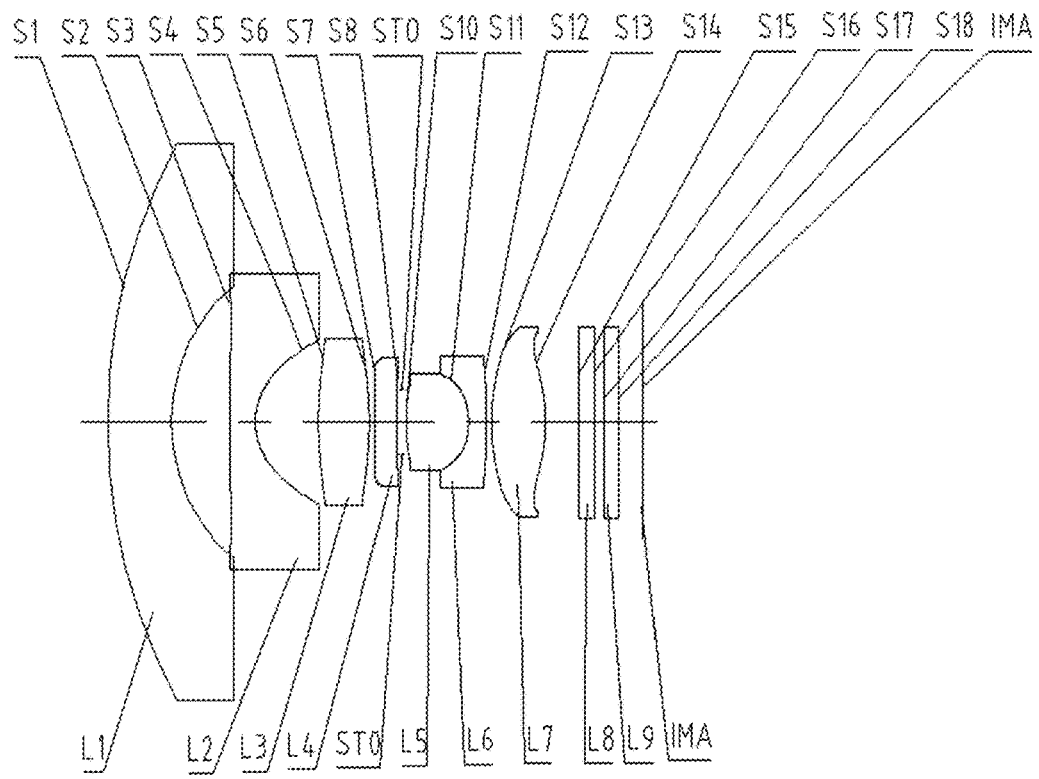
FIG. 5 illustrates a schematic structural view of an optical lens assembly according to Example 5 of the present disclosure.

An optical lens assembly according to Example 5 of the present disclosure is described below with reference to FIG. 5. FIG. 5 is a schematic structural view showing an optical lens assembly according to Example 5 of the present disclosure.

As shown in FIG. 5, the optical lens assembly includes a first lens L1, a second lens L2, a third lens L3, a fourth lens L4, a fifth lens L5, a sixth lens L6 and a seventh lens L7, which are arranged sequentially along an optical axis from an object side to an imaging side of the optical lens assembly.

The first lens L1 is a meniscus lens having negative refractive power, an object-side surface S1 thereof is convex, and an image-side surface S2 thereof is concave. The second lens L2 is a meniscus lens having negative refractive power, an object-side surface S3 thereof is convex, and an image-side surface S4 thereof is concave. The third lens L3 is a biconvex lens having positive refractive power, and both of an object-side surface S5 and an image-side surface S6 thereof are convex. The fourth lens L4 is a meniscus lens having negative refractive power, an object-side surface S7 thereof is convex, and an image-side surface S8 thereof is concave. The fifth lens L5 is a biconvex lens having positive refractive power, and both of an object-side surface S10 and an image-side surface S11 thereof are convex. The sixth lens L6 is a meniscus lens having negative refractive power, an object-side surface S11 thereof is concave, and an image-side surface S12 thereof is convex. The fifth lens L5 and the sixth lens L6 are cemented together to form a cemented lens. The seventh lens L7 is a biconvex lens having positive refractive power, and both of an object-side surface S13 and an image-side surface S14 thereof are convex.

In the present example, the second lens L2, the fourth lens L4, the fifth lens L5, the sixth lens L6 and the seventh lens L7 are all aspheric lenses, and the respective object-side surfaces and image-side surfaces thereof are aspheric surfaces.

Optionally, the optical lens assembly may further include a optical filter L8 having an object-side surface S15 and an image-side surface S16 and a protective lens L9 having an object-side surface S17 and an image-side surface S18. The optical filter L8 may be used to correct color deviations. The protective lens L9 may be used to protect an image sensor chip located on an imaging plane IMA. Light from an object sequentially passes through the surfaces S1 to S18 and is finally imaged on the imaging plane IMA.

In the optical lens assembly of the present example, a stop STO may be disposed between the fourth lens L4 and the fifth lens L5 (i.e., between the fourth lens L4 and the cemented lens) to improve image quality.

The present example employs seven lenses as an example. By properly distributing the refractive power and surface shape of each lens, the center thickness of each lens, and the air gap between the lenses, the lens assembly may have at least one of the beneficial effects of miniaturization, high resolution, low cost, and small front end aperture.

Table 13 shows the radius of curvature R, the thickness T, the refractive index Nd, and the Abbe number Vd of each lens of the optical lens assembly of Example 5, wherein the units of radius of the curvature R and the thickness T are both millimeters (mm). Table 14 below shows the conic coefficient k and the high-order coefficients A, B, C, D and E applicable to aspheric surfaces S3-S4, S7-S8, and S10-14 in Example 5, wherein the surface type of each aspheric surface may be defined by the formula (1) given in the above Example 1. Table 15 below shows a total focal length F of the optical lens assembly, a refractive index Nd1 of a material of the first lens L1, a radius of curvature r41 of the object-side surface S7 of the fourth lens L4, a radius of curvature r42 of the image-side surface S8 of the fourth lens L4, a center thickness d4 of the fourth lens L4, a maximum effective aperture diameter D of the object-side surface S1 of the first lens L1 corresponding to a maximum field-of-view of the optical lens assembly, an image height h corresponding to the maximum field-of-view of the optical lens assembly, the maximum field-of-view FOV of the optical lens assembly, an optical back focus length BFL of the optical lens assembly (i.e., a distance along the optical axis from a center of the image-side surface S14 of the seventh lens L7, the last lens, to the imaging plane IMA) and a total track length TTL of the optical lens assembly (i.e., a distance along the optical axis from a center of the object-side surface S1 of the first lens L1 to the imaging plane IMA) in Example 5.

TABLE 13

| Surface No. | Radius of Curvature R | Thickness T | Refractive Index Nd | Abbe Number Vd |
|---|---|---|---|---|
| S1 | 12.6500 | 1.9600 | 1.77 | 49.6 |
| S2 | 4.0000 | 1.8000 | | |
| S3 | 56.5000 | 0.7900 | 1.51 | 57.0 |
| S4 | 1.4000 | 1.9700 | | |
| S5 | 10.9000 | 1.6000 | 1.92 | 20.9 |
| S6 | −8.2000 | 0.1000 | | |
| S7 | 10.0000 | 0.6600 | 1.51 | 57.0 |
| S8 | 7.9500 | 0.1600 | | |
| STO | Infinite | 0.1300 | | |
| S10 | 4.4000 | 1.9300 | 1.54 | 56.1 |
| S11 | −1.6000 | 0.5500 | 1.64 | 23.5 |
| S12 | −18.4000 | 0.1000 | | |
| S13 | 4.0000 | 1.6600 | 1.54 | 56.1 |
| S14 | −3.7000 | 1.0500 | | |
| S15 | Infinite | 0.5500 | 1.52 | 64.2 |
| S16 | Infinite | 0.2300 | | |
| S17 | Infinite | 0.4000 | 1.52 | 64.2 |
| S18 | Infinite | 0.8000 | | |
| IMA | Infinite | | | |

TABLE 14

| Surface No. | K | A | B | C | D | E |
|---|---|---|---|---|---|---|
| S3 | 137.5890 | 1.3885E−04 | −2.3259E−04 | 2.0786E−05 | −7.6459E−07 | 8.7305E−09 |
| S4 | −0.8499 | 1.6926E−02 | −7.6301E−07 | 1.7165E−04 | −1.0212E−04 | 4.5910E−06 |
| S7 | −1528.4850 | 5.5944E−04 | −3.0745E−03 | −5.9357E−03 | −4.3465E−04 | 1.6975E−03 |
| S8 | −183.0386 | −3.6430E−03 | −1.1418E−02 | −2.3543E−03 | 8.9430E−04 | 2.2689E−03 |
| S10 | 2.8083 | 3.3667E−03 | −4.0108E−03 | 1.1950E−02 | −1.3348E−02 | 7.2063E−03 |

TABLE 14-continued

| Surface No. | K | A | B | C | D | E |
|---|---|---|---|---|---|---|
| S11 | −0.5398 | −7.5513E−02 | −2.4946E−02 | −4.4146E−02 | 2.0364E−02 | −3.7630E−03 |
| S12 | 15.5885 | −7.9703E−03 | 2.9094E−04 | 6.8125E−04 | 6.7224E−05 | −2.4450E−06 |
| S13 | −12.3284 | 3.7900E−04 | 1.7930E−03 | 6.2578E−05 | −1.1332E−05 | 1.1890E−06 |
| S14 | 0.7790 | 7.6064E−03 | 9.0114E−04 | 6.0380E−04 | −1.2085E−04 | 1.7389E−05 |

TABLE 15

| F (mm) | 1.427 | h (mm) | 5.4 |
|---|---|---|---|
| Nd1 | 1.77 | FOV (°) | 196 |
| |r41| (mm) | 10.000 | BFL (mm) | 3.030 |
| |r42| (mm) | 7.950 | TTL (mm) | 16.440 |
| d4 (mm) | 0.660 | | |
| D (mm) | 14.045 | | |

In the present example, the radius of curvature r41 of the object-side surface S7 of the fourth lens L4, the radius of curvature r42 of the image-side surface S8 of the fourth lens L4 and the center thickness d4 of the fourth lens L4 satisfy (|r41|+d4)/|r42|=1.341; the maximum field-of-view FOV of the optical lens assembly, the maximum effective aperture diameter D of the object-side surface S1 of the first lens L1 corresponding to the maximum field-of-view of the optical lens assembly and the image height h corresponding to the maximum field-of-view of the optical lens assembly satisfy D/h/FOV=0.013; the optical back focus length BFL of the optical lens assembly and the total track length TTL of the optical lens assembly satisfy BFL/TTL=0.184; and the total track length TTL of the optical lens assembly, the image height h corresponding to the maximum field-of-view of the optical lens assembly and the maximum field-of-view FOV of the optical lens assembly satisfy TTL/h/FOV=0.016.

EXAMPLE 6

Figure 6:
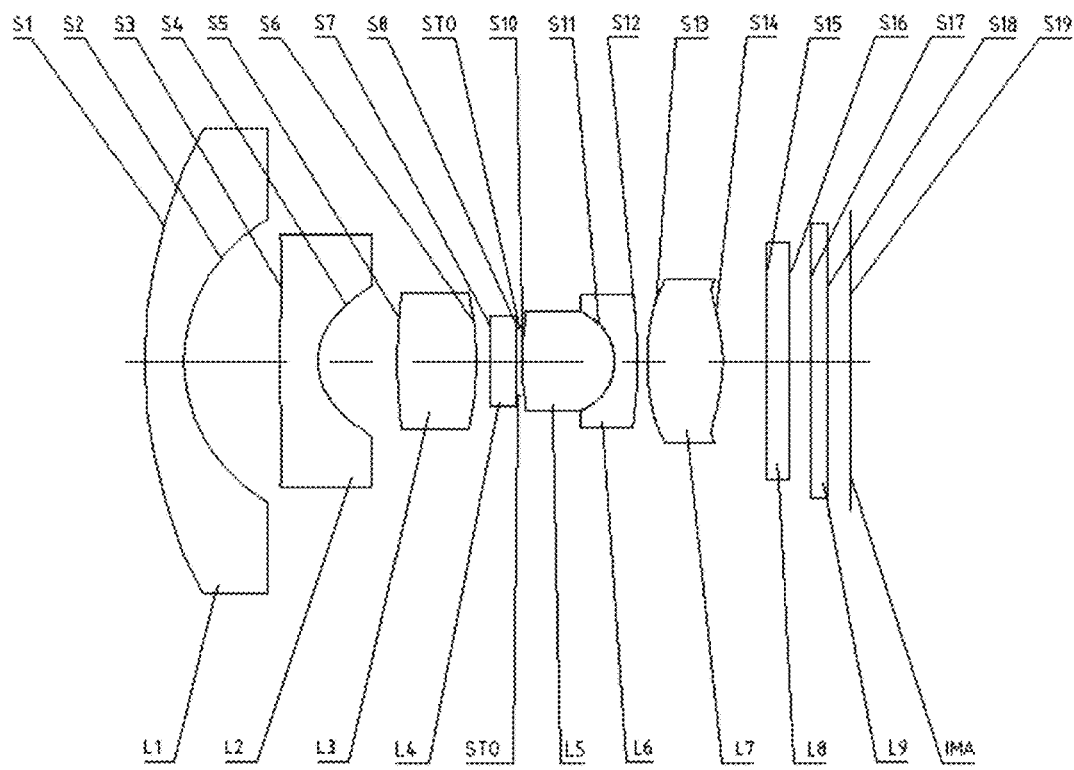
FIG. 6 illustrates a schematic structural view of an optical lens assembly according to Example 6 of the present disclosure.

An optical lens assembly according to Example 6 of the present disclosure is described below with reference to FIG. 6. FIG. 6 is a schematic structural view showing an optical lens assembly according to Example 6 of the present disclosure.

As shown in FIG. 6, the optical lens assembly includes a first lens L1, a second lens L2, a third lens L3, a fourth lens L4, a fifth lens L5, a sixth lens L6 and a seventh lens L7, which are arranged sequentially along an optical axis from an object side to an imaging side of the optical lens assembly.

The first lens L1 is a meniscus lens having negative refractive power, an object-side surface S1 thereof is convex, and an image-side surface S2 thereof is concave. The second lens L2 is a meniscus lens having negative refractive power, an object-side surface S3 thereof is convex, and an image-side surface S4 thereof is concave. The third lens L3 is a biconvex lens having positive refractive power, and both of an object-side surface S5 and an image-side surface S6 thereof are convex. The fourth lens L4 is a biconvex lens having positive refractive power, and both of an object-side surface S7 and an image-side surface S8 thereof are convex. The fifth lens L5 is a biconvex lens having positive refractive power, and both of an object-side surface S10 and an image-side surface S11 thereof are convex. The sixth lens L6 is a meniscus lens having negative refractive power, an object-side surface S11 thereof is concave, and an image-side surface S12 thereof is convex. The fifth lens L5 and the sixth lens L6 are cemented together to form a cemented lens. The seventh lens L7 is a biconvex lens having positive refractive power, and both of an object-side surface S13 and an image-side surface S14 thereof are convex.

In the present example, the second lens L2, the fourth lens L4, the fifth lens L5, the sixth lens L6 and the seventh lens L7 are all aspheric lenses, and the respective object-side surfaces and image-side surfaces thereof are aspheric surfaces.

Optionally, the optical lens assembly may further include a optical filter L8 having an object-side surface S15 and an image-side surface S16 and a protective lens L9 having an object-side surface S17 and an image-side surface S18. The optical filter L8 may be used to correct color deviations. The protective lens L9 may be used to protect an image sensor chip located on an imaging plane IMA. Light from an object sequentially passes through the surfaces S1 to S18 and is finally imaged on the imaging plane IMA.

In the optical lens assembly of the present example, a stop STO may be disposed between the fourth lens L4 and the fifth lens L5 (i.e., between the fourth lens L4 and the cemented lens) to improve image quality.

Table 16 shows the radius of curvature R, the thickness T, the refractive index Nd, and the Abbe number Vd of each lens of the optical lens assembly of Example 6, wherein the units of the radius of curvature R and the thickness T are both millimeters (mm).

TABLE 16

| Surface No. | Radius of Curvature R | Thickness T | Refractive Index Nd | Abbe Number Vd |
|---|---|---|---|---|
| S1 | 11.5000 | 0.9500 | 1.77 | 49.6 |
| S2 | 3.9000 | 2.3000 | | |
| S3 | 72.8000 | 0.9000 | 1.51 | 57.0 |
| S4 | 1.5000 | 1.8800 | | |
| S5 | 13.5000 | 1.8900 | 1.92 | 20.9 |
| S6 | −7.7000 | 0.3000 | | |
| S7 | 82.0000 | 0.6000 | 1.51 | 57.0 |
| S8 | −132.5000 | 0.0500 | | |
| STO | Infinite | 0.1000 | | |
| S10 | 6.0000 | 2.2000 | 1.54 | 56.1 |
| S11 | −1.4000 | 0.5500 | 1.64 | 23.5 |
| S12 | −15.9000 | 0.2400 | | |
| S13 | 4.800 | 1.8000 | 1.59 | 61.1 |
| S14 | −3.9000 | 1.0500 | | |
| S15 | Infinite | 0.5500 | 1.52 | 64.2 |
| S16 | Infinite | 0.5000 | | |
| S17 | Infinite | 0.4000 | 1.52 | 64.2 |
| S18 | Infinite | 0.5500 | | |
| S19 (IMA) | Infinite | | | |

The present example employs seven lenses as an example. By properly distributing the refractive power and surface shape of each lens, the center thickness of each lens, and the air gap between the lenses, the lens assembly may have at least one of the beneficial effects of miniaturization, high resolution, low cost, and small front end aperture.

Table 17 below shows the conic coefficient k and the high-order coefficients A, B, C, D and E applicable to aspheric surfaces S3-S4, S7-S8, and S10-14 in Example 6, wherein the surface type of each aspheric surface may be defined by the formula (1) given in the above Example 1.

TABLE 17

| Surface No. | K | A | B | C | D | E |
|---|---|---|---|---|---|---|
| S3 | 185.6974 | 1.2800E−04 | −2.3702E−04 | 2.0051E−05 | −6.8875E−07 | 1.5995E−08 |
| S4 | −0.8793 | 1.4252E−02 | 5.5575E−04 | 1.6295E−04 | −2.1354E−04 | 1.5885E−05 |
| S7 | 0.0000 | −5.3725E−03 | 1.1076E−03 | 1.2287E−03 | −5.2168E−03 | 5.4533E−03 |
| S8 | 0.0000 | 8.6229E−03 | 8.5836E−04 | −5.6865E−03 | 4.2209E−03 | −1.0456E−02 |
| S10 | 10.1875 | 1.2213E−02 | 1.4260E−02 | 1.8007E−03 | −3.8744E−02 | 1.4469E−02 |
| S11 | −0.6267 | −8.6720E−02 | −1.4084E−02 | −3.2375E−02 | 2.1821E−02 | −5.9221E−03 |
| S12 | −1.9080 | −8.3845E−03 | 4.1484E−04 | 6.3300E−04 | 4.4256E−05 | −2.4613E−05 |
| S13 | −11.7460 | 1.3124E−03 | 2.0433E−03 | 8.7725E−05 | −1.2542E−05 | −4.7043E−07 |
| S14 | 0.6506 | 8.5545E−03 | 1.1070E−03 | 6.0702E−04 | −1.2408E−04 | 5.0147E−05 |

Table 18 below shows a total focal length F of the optical lens assembly, a refractive index Nd1 of a material of the first lens L1, a radius of curvature r41 of the object-side surface S7 of the fourth lens L4, a radius of curvature r42 of the image-side surface S8 of the fourth lens L4, a center thickness d4 of the fourth lens L4, a maximum effective aperture diameter D of the object-side surface S1 of the first lens L1 corresponding to a maximum field-of-view of the optical lens assembly, an image height h corresponding to the maximum field-of-view of the optical lens assembly, the maximum field-of-view FOV of the optical lens assembly, an optical back focus length BFL of the optical lens assembly (i.e. a distance along the optical axis from a center of the image-side surface S14 of the seventh lens L7, the last lens, to the imaging plane S19) and a total track length TTL of the optical lens assembly (i.e. a distance along the optical axis from a center of the object-side surface S1 of the first lens L1 to the imaging plane S19) in Example 6.

TABLE 18

| F (mm) | 1.339 | h (mm) | 6.628 |
|---|---|---|---|
| Nd1 | 1.77 | FOV (°) | 196 |
| |r41| (mm) | 82.000 | BFL (mm) | 3.050 |
| |r42| (mm) | 132.500 | TTL (mm) | 16.810 |
| d4 (mm) | 0.600 | | |
| D (mm) | 13.684 | | |

In the present example, the radius of curvature r41 of the object-side surface S7 of the fourth lens L4, the radius of curvature r42 of the image-side surface S8 of the fourth lens L4 and the center thickness d4 of the fourth lens L4 satisfy (|r41|+d4)/|r42|=0.623; the maximum field-of-view FOV of the optical lens assembly, the maximum effective aperture diameter D of the object-side surface S1 of the first lens L1 corresponding to the maximum field-of-view of the optical lens assembly and the image height h corresponding to the maximum field-of-view of the optical lens assembly satisfy D/h/FOV=0.011; the optical back focus length BFL of the optical lens assembly and the total track length TTL of the optical lens assembly satisfy BFL/TTL=0.181; and the total track length TTL of the optical lens assembly, the image height h corresponding to the maximum field-of-view of the optical lens assembly and the maximum field-of-view FOV of the optical lens assembly satisfy TTL/h/FOV=0.013.

EXAMPLE 7

Figure 7:
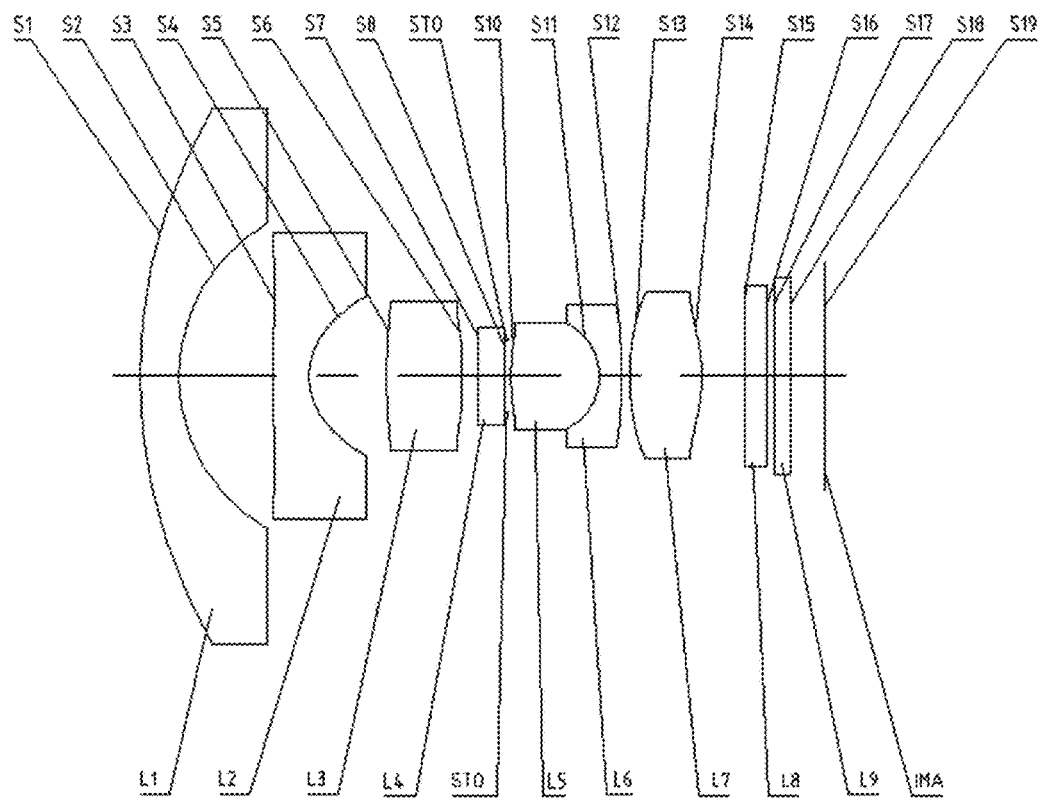
FIG. 7 illustrates a schematic structural view of an optical lens assembly according to Example 7 of the present disclosure.

An optical lens assembly according to Example 7 of the present disclosure is described below with reference to FIG. 7. FIG. 7 is a schematic structural view showing an optical lens assembly according to Example 7 of the present disclosure.

As shown in FIG. 7, the optical lens assembly includes a first lens L1, a second lens L2, a third lens L3, a fourth lens L4, a fifth lens L5, a sixth lens L6 and a seventh lens L7, which are arranged sequentially along an optical axis from an object side to an imaging side of the optical lens assembly.

The first lens L1 is a meniscus lens having negative refractive power, an object-side surface S1 thereof is convex, and an image-side surface S2 thereof is concave. The second lens L2 is a meniscus lens having negative refractive power, an object-side surface S3 thereof is convex, and an image-side surface S4 thereof is concave. The third lens L3 is a biconvex lens having positive refractive power, and both of an object-side surface S5 and an image-side surface S6 thereof are convex. The fourth lens L4 is a biconvex lens having positive refractive power, and both of an object-side surface S7 and an image-side surface S8 thereof are convex. The fifth lens L5 is a biconvex lens having positive refractive power, and both of an object-side surface S10 and an image-side surface S11 thereof are convex. The sixth lens L6 is a meniscus lens having negative refractive power, an object-side surface S11 thereof is concave, and an image-side surface S12 thereof is a convex. The fifth lens L5 and the sixth lens L6 are cemented together to form a cemented lens. The seventh lens L7 is a biconvex lens having positive refractive power, and both of an object-side surface S13 and an image-side surface S14 thereof are convex.

In the present example, the second lens L2, the fourth lens L4, the fifth lens L5, the sixth lens L6 and the seventh lens L7 are all aspheric lenses, and the respective object-side surfaces and image-side surfaces thereof are aspheric surfaces.

Optionally, the optical lens assembly may further include a optical filter L8 having an object-side surface S15 and an image-side surface S16 and a protective lens L9 having an object-side surface S17 and an image-side surface S18. The optical filter L8 may be used to correct color deviations. The protective lens L9 may be used to protect an image sensor chip located on an imaging plane IMA. Light from an object sequentially passes through the surfaces S1 to S18 and is finally imaged on the imaging plane IMA.

In the optical lens assembly of the present example, a stop STO may be disposed between the fourth lens L4 and the fifth lens L5 (i.e., between the fourth lens L4 and the cemented lens) to improve image quality.

The present example employs seven lenses as an example. By properly distributing the refractive power and surface shape of each lens, the center thickness of each lens, and the air gap between the lenses, the lens assembly may have at least one of the beneficial effects of miniaturization, high resolution, low cost, and small front end aperture.

Table 19 below shows the radius of curvature R, the thickness T, the refractive index Nd, and the Abbe number Vd of each lens of the optical lens assembly of Example 7, wherein the units of the radius of curvature R and the thickness T are both millimeters (mm). Table 20 below shows the conic coefficient k and the high-order coefficients A, B, C, D and E applicable to aspheric surfaces S3-S4, S7-S8, and S10-14 in Example 7, wherein the surface type of each aspheric surface may be defined by the formula (1) given in the above Example 1. Table 21 below shows a total focal length F of the optical lens assembly, a refractive index Nd1 of a material of the first lens L1, a radius of curvature r41 of the object-side surface S7 of the fourth lens L4, a radius of curvature r42 of the image-side surface S8 of the fourth lens L4, a center thickness d4 of the fourth lens L4, a maximum effective aperture diameter D of the object-side surface S1 of the first lens L1 corresponding to a maximum field-of-view of the optical lens assembly, an image height h corresponding to the maximum field-of-view of the optical lens assembly, the maximum field-of-view FOV of the optical lens assembly, an optical back focus length BFL of the optical lens assembly (i.e. a distance along the optical axis from a center of the image-side surface S14 of the seventh lens L7, the last lens, to the imaging plane S19) and a total track length TTL of the optical lens assembly (i.e. a distance along the optical axis from a center of the object-side surface S1 of the first lens L1 to the imaging plane S19) in Example 7.

In the present example, the radius of curvature r41 of the object-side surface S7 of the fourth lens L4, the radius of curvature r42 of the image-side surface S8 of the fourth lens L4 and the center thickness d4 of the fourth lens L4 satisfy (|r41|+d4)/|r42|=0.935; the maximum field-of-view FOV of the optical lens assembly, the maximum effective aperture diameter D of the object-side surface S1 of the first lens L1 corresponding to the maximum field-of-view of the optical lens assembly and the image height h corresponding to the maximum field-of-view of the optical lens assembly satisfy D/h/FOV=0.012; the optical back focus length BFL of the optical lens assembly and the total track length TTL of the optical lens assembly satisfy BFL/TTL=0.179; and the total track length TTL of the optical lens assembly, the image height h corresponding to the maximum field-of-view of the optical lens assembly and the maximum field-of-view FOV of the optical lens assembly satisfy TTL/h/FOV=0.017.

EXAMPLE 8

Figure 8:
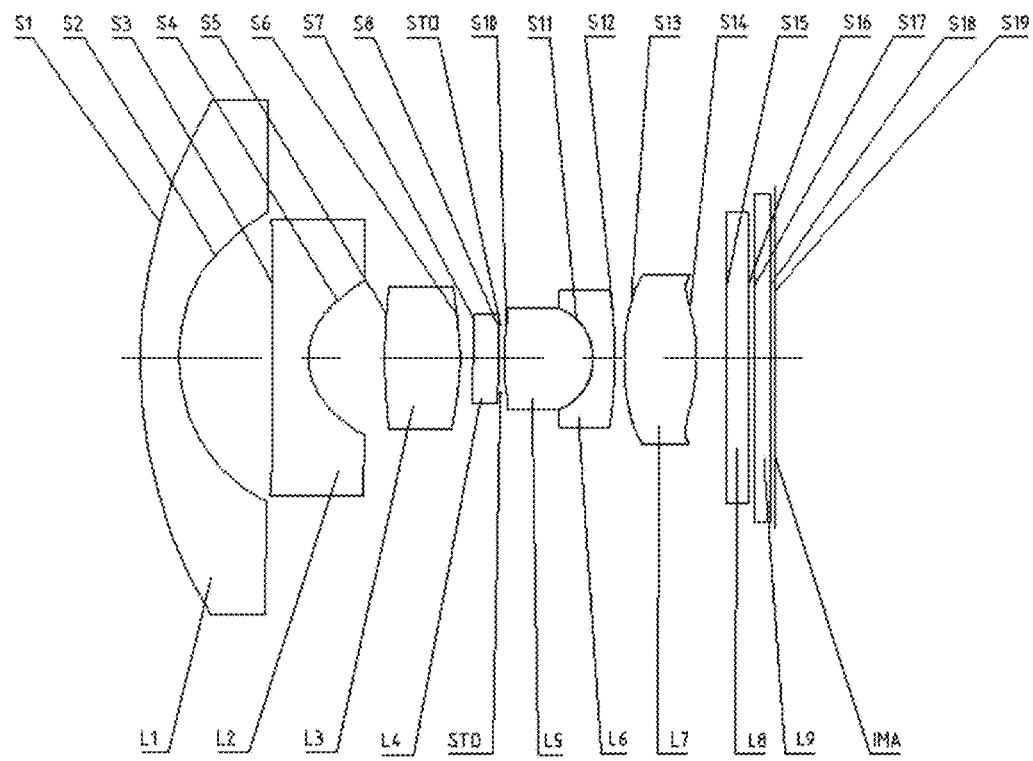
FIG. 8 illustrates a schematic structural view of an optical lens assembly according to Example 8 of the present disclosure.

An optical lens assembly according to Example 8 of the present disclosure is described below with reference to FIG. 8. FIG. 8 is a schematic structural view showing an optical lens assembly according to Example 8 of the present disclosure.

As shown in FIG. 8, the optical lens assembly includes a first lens L1, a second lens L2, a third lens L3, a fourth lens L4, a fifth lens L5, a sixth lens L6 and a seventh lens L7, which are arranged sequentially along an optical axis from an object side to an imaging side of the optical lens assembly.

The first lens L1 is a meniscus lens having negative refractive power, an object-side surface S1 thereof is convex, and an image-side surface S2 thereof is concave. The second lens L2 is a meniscus lens having negative refractive power, an object-side surface S3 thereof is convex, and an image-side surface S4 thereof is concave. The third lens L3 is a biconvex lens having positive refractive power, and both of an object-side surface S5 and an image-side surface S6 thereof are convex. The fourth lens L4 is a biconvex lens having positive refractive power, and both of an object-side surface S7 and an image-side surface S8 thereof are convex. The fifth lens L5 is a biconvex lens having positive refractive power, and both of an object-side surface S10 and an image-side surface S11 thereof are convex. The sixth lens L6 is a meniscus lens having negative refractive power, an object-side surface S11 thereof is concave, and an image-side surface S12 thereof is convex. The fifth lens L5 and the sixth lens L6 are cemented together to form a cemented lens. The seventh lens L7 is a biconvex lens having positive refractive power, and both of an object-side surface S13 and an image-side surface S14 thereof are convex.

In the present example, the second lens L2, the fourth lens L4, the fifth lens L5, the sixth lens L6 and the seventh lens

TABLE 19

| Surface No. | Radius of Curvature R | Thickness T | Refractive Index Nd | Abbe Number Vd |
|---|---|---|---|---|
| S1 | 11.5000 | 0.9500 | 1.80 | 49.6 |
| S2 | 3.9000 | 2.3300 | | |
| S3 | 73.4000 | 0.8800 | 1.51 | 31.8 |
| S4 | 1.5000 | 1.9000 | | |
| S5 | 13.6000 | 1.8900 | 1.92 | 28.5 |
| S6 | −7.7000 | 0.4000 | | |
| S7 | 36.7000 | 0.7000 | 1.51 | 57.0 |
| S8 | −40.0000 | 0.0500 | | |
| STO | Infinite | 0.1000 | | |
| S10 | 6.3000 | 2.2000 | 1.53 | 117.5 |
| S11 | −1.4000 | 0.5500 | 1.64 | 23.5 |
| S12 | −16.3000 | 0.2000 | | |
| S13 | 5.0000 | 1.7600 | 1.59 | 61.1 |
| S14 | −4.0000 | 1.0500 | | |
| S15 | Infinite | 0.5500 | 1.52 | 64.2 |
| S16 | Infinite | 0.2000 | | |
| S17 | Infinite | 0.4000 | 1.52 | 64.2 |
| S18 | Infinite | 0.8400 | | |
| S19 (IMA) | Infinite | | | |

TABLE 20

| Surface No. | K | A | B | C | D | E |
|---|---|---|---|---|---|---|
| S3 | 158.1323 | 1.2422E−04 | −2.3817E−04 | 1.9964E−05 | −6.9126E−07 | 4.1567E−09 |
| S4 | −0.8730 | 1.4725E−02 | 6.2864E−04 | 1.7012E−04 | −2.1960E−04 | 5.5836E−05 |
| S7 | 0.0000 | −4.3868E−03 | 2.8126E−04 | 1.1586E−03 | −6.0334E−03 | 5.9079E−03 |
| S8 | 0.0000 | 7.7528E−03 | −3.6717E−03 | −1.3005E−02 | 1.1629E−03 | 1.0385E−02 |
| S10 | 9.3386 | 1.2017E−02 | 1.0540E−02 | −3.5517E−03 | −3.9653E−02 | 3.4109E−02 |
| S11 | −0.6517 | −7.9244E−02 | −1.8418E−02 | −2.9450E−02 | 2.7886E−02 | −4.3812E−03 |
| S12 | −7.2530 | −8.1353E−03 | 5.0014E−02 | 6.6137E−04 | 5.0703E−05 | −8.9261E−05 |
| S13 | −11.4582 | 1.2391E−03 | 2.0121E−03 | 8.4401E−05 | −1.2290E−05 | −2.4009E−07 |
| S14 | 0.6285 | 8.7384E−03 | 1.1616E−03 | 6.0684E−04 | −1.2682E−04 | 2.4513E−05 |

TABLE 21

| F (mm) | 1.325 | h (mm) | 5.142 |
|---|---|---|---|
| Nd1 | 1.80 | FOV (°) | 196 |
| |r41| (mm) | 36.700 | BFL (mm) | 3.040 |
| |r42| (mm) | 40.000 | TTL (mm) | 16.950 |
| d4 (mm) | 0.700 | | |
| D (mm) | 12.251 | | |

L7 are all aspheric lenses, and the respective object-side surfaces and image-side surfaces thereof are aspheric surfaces.

Optionally, the optical lens assembly may further include a optical filter L8 having an object-side surface S15 and an image-side surface S16 and a protective lens L9 having an object-side surface S17 and an image-side surface S18. The optical filter L8 may be used to correct color deviations. The protective lens L9 may be used to protect an image sensor chip located on an imaging plane IMA. Light from an object sequentially passes through the surfaces S1 to S18 and is finally imaged on the imaging plane IMA.

In the optical lens assembly of the present example, a stop STO may be disposed between the fourth lens L4 and the fifth lens L5 (i.e., between the fourth lens L4 and the cemented lens) to improve image quality.

The present example employs seven lenses as an example. By properly distributing the refractive power and surface shape of each lens, the center thickness of each lens, and the air gap between the lenses, the lens assembly may have at least one of the beneficial effects of miniaturization, high resolution, low cost, and small front end aperture.

Table 22 below shows radius of the curvature R, the thickness T, the refractive index Nd, and the Abbe number Vd of each lens of the optical lens assembly of Example 8, wherein the units of the radius of curvature R and the thickness T are both millimeters (mm). Table 23 below shows the conic coefficient k and the high-order coefficients A, B, C, D and E applicable to aspheric surfaces S3-S4, S7-S8, and S10-14 in Example 8, wherein the surface type of each aspheric surface may be defined by the formula (1) given in the above Example 1. Table 24 below shows a total focal length F of the optical lens assembly, a refractive index Nd1 of a material of the first lens L1, a radius of curvature r41 of the object-side surface S7 of the fourth lens L4, a radius of curvature r42 of the image-side surface S8 of the fourth lens L4, a center thickness d4 of the fourth lens L4, a maximum effective aperture diameter D of the object-side surface S1 of the first lens L1 corresponding to a maximum field-of-view of the optical lens assembly, an image height h corresponding to the maximum field-of-view of the optical lens assembly, the maximum field-of-view FOV of the optical lens assembly, an optical back focus length BFL of the optical lens assembly (i.e., a distance along the optical axis from a center of the image-side surface S14 of the seventh lens L7, the last lens, to the imaging plane S19) and a total track length TTL of the optical lens assembly (i.e., a distance along the optical axis from a center of the object-side surface S1 of the first lens L1 to the imaging plane S19) in Example 8.

TABLE 22

| Surface No. | Radius of Curvature R | Thickness T | Refractive Index Nd | Abbe Number Vd |
|---|---|---|---|---|
| S1 | 11.5500 | 0.9500 | 1.77 | 49.2 |
| S2 | 3.8600 | 2.3400 | | |
| S3 | 73.4000 | 0.9000 | 1.51 | 57.0 |
| S4 | 1.4700 | 1.8900 | | |
| S5 | 13.5000 | 1.8900 | 1.92 | 20.9 |
| S6 | −7.7000 | 0.3000 | | |
| S7 | 69.0000 | 0.6000 | 1.56 | 1.7 |
| S8 | −80.7000 | 0.0500 | | |
| STO | Infinite | 0.1000 | | |
| S10 | 6.0000 | 2.2000 | 1.54 | 72.8 |
| S11 | −1.4000 | 0.5500 | 1.64 | 21.1 |
| S12 | −16.0000 | 0.2400 | | |
| S13 | 4.8000 | 1.8000 | 1.59 | 61.1 |
| S14 | −3.9000 | 0.7500 | | |
| S15 | Infinite | 0.5500 | 1.52 | 64.2 |
| S16 | Infinite | 0.1500 | | |
| S17 | Infinite | 0.4000 | 1.52 | 64.2 |
| S18 | Infinite | 0.1200 | | |
| S19 (IMA) | Infinite | | | |

TABLE 23

| Surface No. | K | A | B | C | D | E |
|---|---|---|---|---|---|---|
| S3 | 180.6618 | 1.2566E−04 | −2.3720E−04 | 2.0025E−05 | −6.9288E−07 | 4.0020E−09 |
| S4 | −0.8752 | 1.4492E−02 | 5.6593E−04 | 1.5367E−04 | −2.1837E−04 | 2.9921E−05 |
| S7 | −0.0192 | −5.7050E−03 | 1.3537E−03 | 2.6837E−04 | −4.7890E−03 | 2.7267E−03 |
| S8 | 1.3932 | 8.1562E−03 | −1.3699E−03 | −6.8670E−03 | 2.7539E−03 | −3.0144E−04 |
| S10 | 11.8958 | 1.4026E−02 | 1.4205E−02 | −1.2421E−03 | −3.9402E−02 | 1.5930E−02 |
| S11 | −0.6262 | −8.6577E−02 | −1.5939E−02 | −3.1421E−02 | 2.3449E−02 | −6.0640E−03 |
| S12 | −3.1577 | −8.3393E−03 | 4.1879E−04 | 6.3135E−04 | 4.0970E−05 | −4.2291E−05 |
| S13 | −11.7906 | 1.2915E−03 | 2.0365E−03 | 8.5159E−05 | −1.2944E−05 | −4.9154E−07 |
| S14 | 0.6500 | 8.5682E−03 | 1.1046E−03 | 6.0633E−04 | −1.2441E−04 | 5.0096E−05 |

TABLE 24

| F (mm) | 1.340 | h (mm) | 4.936 |
|---|---|---|---|
| Nd1 | 1.77 | FOV (°) | 196 |
| |r41| (mm) | 69.000 | BFL (mm) | 1.970 |
| |r42| (mm) | 80.700 | TTL (mm) | 15.780 |
| d4 (mm) | 0.600 | | |
| D (mm) | 12.416 | | |

In the present example, the radius of curvature r41 of the object-side surface S7 of the fourth lens L4, the radius of curvature r42 of the image-side surface S8 of the fourth lens L4 and the center thickness d4 of the fourth lens L4 satisfy (|r41|+d4)/|r42|=0.862; the maximum field-of-view FOV of the optical lens assembly, the maximum effective aperture diameter D of the object-side surface S1 of the first lens L1 corresponding to the maximum field-of-view of the optical lens assembly and the image height h corresponding to the maximum field-of-view of the optical lens assembly satisfy D/h/FOV=0.013; the optical back focus length BFL of the optical lens assembly and the total track length TTL of the optical lens assembly satisfy BFL/TTL=0.125; and the total track length TTL of the optical lens assembly, the image height h corresponding to the maximum field-of-view of the optical lens assembly and the maximum field-of-view FOV of the optical lens assembly satisfy TTL/h/FOV=0.016.

In view of the above, Examples 1 to 8 satisfy the relationship shown in Table 25 below, respectively.

TABLE 25

| Condition | Example | | | | | | | |
|---|---|---|---|---|---|---|---|---|
| | 1 | 2 | 3 | 4 | 5 | 6 | 7 | 8 |
| (|r41| + d4)/|r42| | 1.704 | 0.776 | 1.865 | 1.886 | 1.341 | 0.623 | 0.935 | 0.862 |
| D/h/FOV | 0.012 | 0.013 | 0.014 | 0.013 | 0.013 | 0.011 | 0.012 | 0.013 |
| BFL/TTL | 0.174 | 0.178 | 0.177 | 0.177 | 0.184 | 0.181 | 0.179 | 0.125 |
| TTL/h/FOV | 0.015 | 0.017 | 0.016 | 0.018 | 0.016 | 0.013 | 0.017 | 0.016 |

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical lens assembly, comprising: a first lens, a second lens, a third lens, a fourth lens, a fifth lens, a sixth lens and a seventh lens, which are arranged sequentially from an object side to an image side along an optical axis, wherein,
the first lens has negative refractive power, an object-side surface of the first lens is convex, and an image-side surface of the first lens is concave;
the second lens has negative refractive power, an object-side surface of the second lens is convex, and an image-side surface of the second lens is concave;
the third lens has positive refractive power, and both of an object-side surface and an image-side surface of the third lens are convex;
the fourth lens has refractive power;
the fifth lens and the sixth lens are cemented to form a cemented lens; and
the seventh lens has positive refractive power, and both of an object-side surface and an image-side surface of the seventh lens are convex; and
wherein D/(h×FOV)≤0.025,
where FOV is a maximum field-of-view of the optical lens assembly,
D is a maximum effective aperture diameter of the object-side surface of the first lens corresponding to the maximum field-of-view of the optical lens assembly, and
h is an image height corresponding to the maximum field-of-view of the optical lens assembly.

2. The optical lens assembly according to claim 1, wherein the fourth lens has positive refractive power, and both of an object-side surface and an image-side surface of the fourth lens are convex.

3. The optical lens assembly according to claim 1, wherein the fourth lens has negative refractive power, and an image-side surface of the fourth lens is concave.

4. The optical lens assembly according to claim 1, wherein the fifth lens has positive refractive power, and both of an object-side surface and an image-side surface of the fifth lens are convex; and
the sixth lens has negative refractive power, an object-side surface of the sixth lens is concave, and an image-side surface of the sixth lens is convex.

5. The optical lens assembly according to claim 1, wherein at least four lenses among the first to the seventh lenses are aspheric lenses.

6. The optical lens assembly according to claim 1, wherein TTL/(h×FOV)≤0.025,
where TTL is a distance along the optical axis from a center of the object-side surface of the first lens to an imaging plane of the optical lens assembly,
h is an image height corresponding to a maximum field-of-view of the optical lens assembly, and
FOV is the maximum field-of-view of the optical lens assembly.

7. The optical lens assembly according to claim 1, wherein 0.3≤ (|r41|+d4)/|r42|≤2.2,
where r41 is a radius of curvature of an object-side surface of the fourth lens,
r42 is a radius of curvature of an image-side surface of the fourth lens, and
d4 is a center thickness of the fourth lens.

8. The optical lens assembly according to claim 1, wherein BFL/TTL≥0.1,
where BFL is a distance along the optical axis from a center of the image-side surface of the seventh lens to an imaging plane of the optical lens assembly, and
TTL is a distance along the optical axis from a center of the object-side surface of the first lens to the imaging plane of the optical lens assembly.

9. The optical lens assembly according to claim 1, wherein TTL/(h×FOV)≤0.02; or
TTL/(h×FOV)≤0.018
where TTL is a distance along the optical axis from a center of the object-side surface of the first lens to an imaging plane of the optical lens assembly,
h is an image height corresponding to a maximum field-of-view of the optical lens assembly, and
FOV is the maximum field-of-view of the optical lens assembly; or
0.1≤BFL/TTL≤0.184,
where BFL is a distance along the optical axis from a center of the image-side surface of the seventh lens to an imaging plane of the optical lens assembly; or
0.3≤(|r41|+d4)/|r42|≤1.886,
where r41 is a radius of curvature of an object-side surface of the fourth lens,
r42 is a radius of curvature of an image-side surface of the fourth lens, and
d4 is a center thickness of the fourth lens.

10. An optical lens assembly, comprising: a first lens, a second lens, a third lens, a fourth lens, a fifth lens, a sixth lens and a seventh lens, which are arranged sequentially from an object side to an image side along an optical axis, wherein,
each of the first lens and the second lens has negative refractive power;
an object-side surface of the second lens is convex, and an image-side surface of the second lens is concave;
each of the third lens and the seventh lens has positive refractive power, an object-side surface of the third lens is convex, and both of an object-side surface and an image-side surface of the seventh lens are convex;
the fifth lens and the sixth lens are cemented to form a cemented lens;
TTL/(h×FOV)≤0.025, where TTL is a distance along the optical axis from a center of an object-side surface of the first lens to an imaging plane of the optical lens assembly, h is an image height corresponding to a maximum field-of-view of the optical lens assembly, and FOV is the maximum field-of-view of the optical lens assembly; and wherein D/(h×FOV)≤0.025, where D is a maximum effective aperture diameter of the object-side surface of the first lens corresponding to the maximum field-of-view of the optical lens assembly.

11. The optical lens assembly according to claim 10, wherein the object-side surface of the first lens is convex, and an image-side surface of the first lens is concave.

12. The optical lens assembly according to claim 10, wherein an image-side surface of the third lens is convex.

13. The optical lens assembly according to claim 10, wherein the fourth lens has positive refractive power, and both of an object-side surface and an image-side surface of the fourth lens are convex.

14. The optical lens assembly according to claim 10, wherein the fourth lens has negative refractive power, and an image-side surface of the fourth lens is concave.

15. The optical lens assembly according to claim 10, wherein the fifth lens has positive refractive power, and both of an object-side surface and an image-side surface of the fifth lens are convex; and the sixth lens has negative refractive power, an object-side surface of the sixth lens is concave, and an image-side surface of the sixth lens is convex.

16. The optical lens assembly according to claim 10, wherein at least four lenses among the first to the seventh lenses are aspheric lenses.

17. The optical lens assembly according to claim 10, wherein 0.3≤(|r41|+d4)/|r42|≤2.2, where r41 is a radius of curvature of an object-side surface of the fourth lens, r42 is a radius of curvature of an image-side surface of the fourth lens, and d4 is a center thickness of the fourth lens.

18. The optical lens assembly according to claim 10, wherein BFL/TTL≥ 0.1, where BFL is a distance along the optical axis from a center of an image-side surface of the seventh lens to the imaging plane of the optical lens assembly, and TTL is the distance along the optical axis from the center of the object-side surface of the first lens to the imaging plane of the optical lens assembly.

19. The optical lens assembly according to claim 10, wherein TTL/(h×FOV)≤0.02, or TTL/(h×FOV)≤0.018 where TTL is a distance along the optical axis from a center of the object-side surface of the first lens to an imaging plane of the optical lens assembly, h is an image height corresponding to a maximum field-of-view of the optical lens assembly, and FOV is the maximum field-of-view of the optical lens assembly; or 0.1≤BFL/TTL≤0.184, where BFL is a distance along the optical axis from a center of the image-side surface of the seventh lens to an imaging plane of the optical lens assembly; or 0.3≤(|r41|+d4)/|r42|≤1.886, where r41 is a radius of curvature of an object-side surface of the fourth lens, r42 is a radius of curvature of an image-side surface of the fourth lens, and d4 is a center thickness of the fourth lens.

* * * * *